US011917634B2

(12) United States Patent
Balasubramanian et al.

(10) Patent No.: US 11,917,634 B2
(45) Date of Patent: Feb. 27, 2024

(54) SIGNAL DESIGN ASSOCIATED WITH CONCURRENT DELIVERY OF ENERGY AND INFORMATION

(71) Applicant: InterDigital Patent Holdings, Inc., Wilmington, DE (US)

(72) Inventors: Anantharaman Balasubramanian, San Diego, CA (US); Tanbir Haque, Jackson Heights, NY (US); Ravikumar Pragada, Warrington, PA (US); Hussain Elkotby, Conshohocken, PA (US); Patrick Cabrol, Bayshore, NY (US); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 383 days.

(21) Appl. No.: 17/414,930

(22) PCT Filed: Dec. 17, 2019

(86) PCT No.: PCT/US2019/066783
§ 371 (c)(1),
(2) Date: Jun. 16, 2021

(87) PCT Pub. No.: WO2020/131834
PCT Pub. Date: Jun. 25, 2020

(65) Prior Publication Data
US 2022/0070836 A1 Mar. 3, 2022

Related U.S. Application Data

(60) Provisional application No. 62/886,028, filed on Aug. 13, 2019, provisional application No. 62/780,394, filed on Dec. 17, 2018.

(51) Int. Cl.
*H04W 72/23* (2023.01)
*H02J 50/80* (2016.01)
(Continued)

(52) U.S. Cl.
CPC ........... *H04W 72/23* (2023.01); *H02J 50/001* (2020.01); *H02J 50/20* (2016.02); *H02J 50/80* (2016.02); *H04J 11/003* (2013.01); *H04J 11/004* (2013.01)

(58) Field of Classification Search
None
See application file for complete search history.

(56) References Cited

U.S. PATENT DOCUMENTS 9,602,955 B2 * 3/2017 Cronie ................. H04B 5/0037
9,641,205 B1 * 5/2017 Hyun .................... H04B 1/525
(Continued)

FOREIGN PATENT DOCUMENTS

| WO | 2018222491 A1 | 12/2018 |
| WO | 2019108940 A1 | 6/2019 |
| WO | 202023665 A1 | 1/2020 |

OTHER PUBLICATIONS

Boaventura et al., "Spatial Power Combining of Multi-Sine Signals for Wireless Power Transfer Applications", IEEE Transactions on Microwave Theory and Techniques, vol. 62, No. 4, Apr. 2014, pp. 1022-1030.
(Continued)

*Primary Examiner* — Mariela Vidal Carpio
(74) *Attorney, Agent, or Firm* — CONDO ROCCIA KOPTIW LLP

(57) ABSTRACT

A base transmission signal and an auxiliary transmission signal may be used to (e.g., concurrently) improve a harvesting efficiency of an energy receiver while maintaining a prespecified performance level of an information receiver. An auxiliary transmission signal may be constructed. The construction of the auxiliary transmission signal may be signaled. An auxiliary transmission signal may be adapted. The adaptation of the auxiliary transmission signal may be signaled. An impact of auxiliary transmission signals on an
(Continued)

information receiver's performance may be mitigated. One or more narrowband energy harvesting (EH) signals may be used, for example to provide a high peak to average power ratio (PARR) for EH devices (e.g., without significantly impacting overall transmitted signal PARR) characteristics. One or more narrowband auxiliary signals may be used, for example to enhance the PARR characteristics of an information signal sub-band.

15 Claims, 29 Drawing Sheets

(51) Int. Cl.
*H02J 50/20* (2016.01)
*H02J 50/00* (2016.01)
*H04J 11/00* (2006.01)

(56) References Cited

U.S. PATENT DOCUMENTS

| | | | | |
|---|---|---|---|---|
| 10,218,763 | B2* | 2/2019 | Abdoli | H04L 27/2634 |
| 10,637,544 | B1* | 4/2020 | Shattil | H04B 7/0691 |
| 2015/0162008 | A1* | 6/2015 | Villette | G10L 21/038 |
| | | | | 704/500 |
| 2015/0358105 | A1* | 12/2015 | Jung | H04B 7/0452 |
| | | | | 370/329 |
| 2016/0345121 | A1* | 11/2016 | Cronie | H04L 27/2636 |
| 2018/0026820 | A1* | 1/2018 | Kim | H02J 50/20 |
| | | | | 375/259 |
| 2018/0123855 | A1* | 5/2018 | Yoshizawa | H04B 7/0456 |
| 2018/0139081 | A1* | 5/2018 | Guvenkaya | H04L 27/2618 |
| 2019/0132165 | A1* | 5/2019 | Shieh | H04L 27/2691 |
| 2021/0119726 | A1* | 4/2021 | Kim | G06N 3/08 |
| 2022/0191908 | A1* | 6/2022 | Back | H04W 4/40 |
| 2023/0109359 | A1* | 4/2023 | Back | H04L 27/26 |
| | | | | 370/329 |

OTHER PUBLICATIONS

Clerckx et al., "Waveform Design for Wireless Power Transfer", IEEE Transactions on Signal Processing, vol. 64, No. 23, Dec. 1, 2016, pp. 6313-6328.

Collado et al., "Optimal Waveforms for Efficient Wireless Power Transmission", IEEE Microwave and Wireless Components Letters, vol. 24, No. 5, May 2014, pp. 354-356.

Heidari-Bateni et al., "A Chaotic Direct-Sequence Spread-Spectrum Communication System", IEEE Transactions on Communications, vol. 42, No. 2/3/4, Feb./Mar./Apr. 1994, pp. 1524-1527.

Kiayani et al., "Adaptive Nonlinear RF Cancellation for Improved Isolation in Simultaneous Transmit-Receive Systems", IEEE Transactions on Microwave Theory and Techniques, vol. 66, No. 5, May 2018, pp. 2299-2312.

Krier et al., "Active Self-Interference Cancellation of Passband Signals Using Gradient Descent", IEEE 24th International Symposium on Personal, Indoor, and Mobile Radio Communications: Fundamentals and PHY Track, 2013, pp. 1212-1216.

Michaels, Alan J., "Digital Chaotic Communications", PHD Thesis, Georgia Institute of Technology, Aug. 2009, 220 pages.

Pang et al., "Multi-Sine Wireless Power Transfer with a Realistic Channel and Rectifier Model", IEEE Wireless Power Transfer Conference, May 2017, pp. 1-4.

Trotter et al., "Power-Optimized Waveforms for Improving the Range and Reliability of RFID Systems", IEEE Conference on RFID, Apr. 2009, pp. 80-87.

Zhou et al., "Wireless Information and Power Transfer: Architecture Design and Rate-Energy Tradeoff", IEEE Transactions on Communications, vol. 61, No. 11, Nov. 2013, pp. 4754-4767.

* cited by examiner

SIGNAL DESIGN ASSOCIATED WITH CONCURRENT DELIVERY OF ENERGY AND INFORMATION

CROSS-REFERENCE TO RELATED APPLICATIONS

This application is the National Stage Entry under 35 U.S.C. § 371 of Patent Cooperation Treaty Application No. PCT/US2019/066783, filed Dec. 17, 2019, which claims the benefit of U.S. Provisional Application Ser. No. 62/780,394, filed Dec. 17, 2018, and U.S. Provisional Application Ser. No. 62/886,028, filed Aug. 13, 2019, the contents of which are incorporated by reference herein.

BACKGROUND

Mobile communications using wireless communication continue to evolve. A fifth generation may be referred to as 5G. A previous (legacy) generation of mobile communication may be, for example, fourth generation (4G) long term evolution (LTE).

There may be compelling use cases for long-battery-life devices. Long-battery-life devices may include but are not limited to IoT devices, small form factor handsets, wearable devices, and/or implantable devices. Passive and/or semi-passive receivers may enable the use cases. Classes of passive and semi-passive devices may use over-the-air delivery of energy and/or information. Networks may use a heterogeneous mix of active, semi-passive, and/or passive devices. A network may need to concurrently transmit signals bearing information and signals optimized to deliver power. Different types of signals may need to be supported in a same frequency band.

SUMMARY

Systems, methods, and instrumentalities are described herein that may be used for signal design associated with concurrent delivery of energy and information. A base transmission signal and an auxiliary transmission signal may be used to (e.g., concurrently) improve a harvesting efficiency of an energy receiver while maintaining a prespecified performance level of an information receiver. An auxiliary transmission signal may be constructed. The construction of the auxiliary transmission signal may be signaled. An auxiliary transmission signal may be adapted. The adaptation of the auxiliary transmission signal may be signaled. An impact of auxiliary transmission signals on an information receiver's performance may be mitigated. One or more narrowband energy harvesting (EH) signals may be used, for example to provide a high peak to average power ratio (PAPR) for EH devices (e.g., without significantly impacting overall transmitted signal PAPR) characteristics. One or more narrowband auxiliary signals may be used, for example to enhance the PAPR characteristics of an information signal sub-band.

An information receiver (e.g., a wireless transmit/receive unit (WTRU)) may cancel interference from an auxiliary signal that is transmitted by a transmitting entity, using a base station as an example (e.g., an eNB or gNB). For example, the base station may be configured to concurrently serve one or more information receivers and one or more EH devices. The optimal signal PAPR for EH devices and information receivers may be different. For example, a signal having a relatively high PAPR may be optimal for EH devices, while a signal having a relatively low PAPR may be optimal for information transmission and/or reception (e.g., for information recievers). The base station may transmit a signal having a relatively high PAPR to the EH devices and the information receivers. For example, the signal may combine a base information signal and an auxiliary signal, where the auxiliary signal may have a higher PAPR than the base information signal. The combined signal may therefore have a relatively high PAPR. An information receiver that receives the combined signal may decode the base information signal by canceling interference from the auxiliary signal.

The WTRU may receive a codebook (e.g., an auxiliary signal codebook). For example, the auxiliary signal codebook may be preconfigured in the WTRU, or received from a network (e.g., via the base station). The WTRU may receive an indication from the network (e.g., via a downlink control information (DCI)). The indication may identify (e.g., via one or more indices) sub-bands associated with the auxiliary signal, and/or one or more time durations associated with the sub-bands. For example, each sub-band may be associated with a separate time duration. The indication may further indicate a parameter associated with the auxiliary signal (e.g., a sequence type of the auxiliary signal). The WTRU may identify the auxiliary signal based on the auxiliary signal codebook and the indication. For example, the WTRU may use the information indicated in the indication to perform a lookup operation in the auxiliary signal codebook. The WTRU may decode a base information signal based on the identified auxiliary signal. For example, the WTRU may cancel interference from the identified auxiliary signal in the base information signal.

DETAILED DESCRIPTION

Figure 1A:
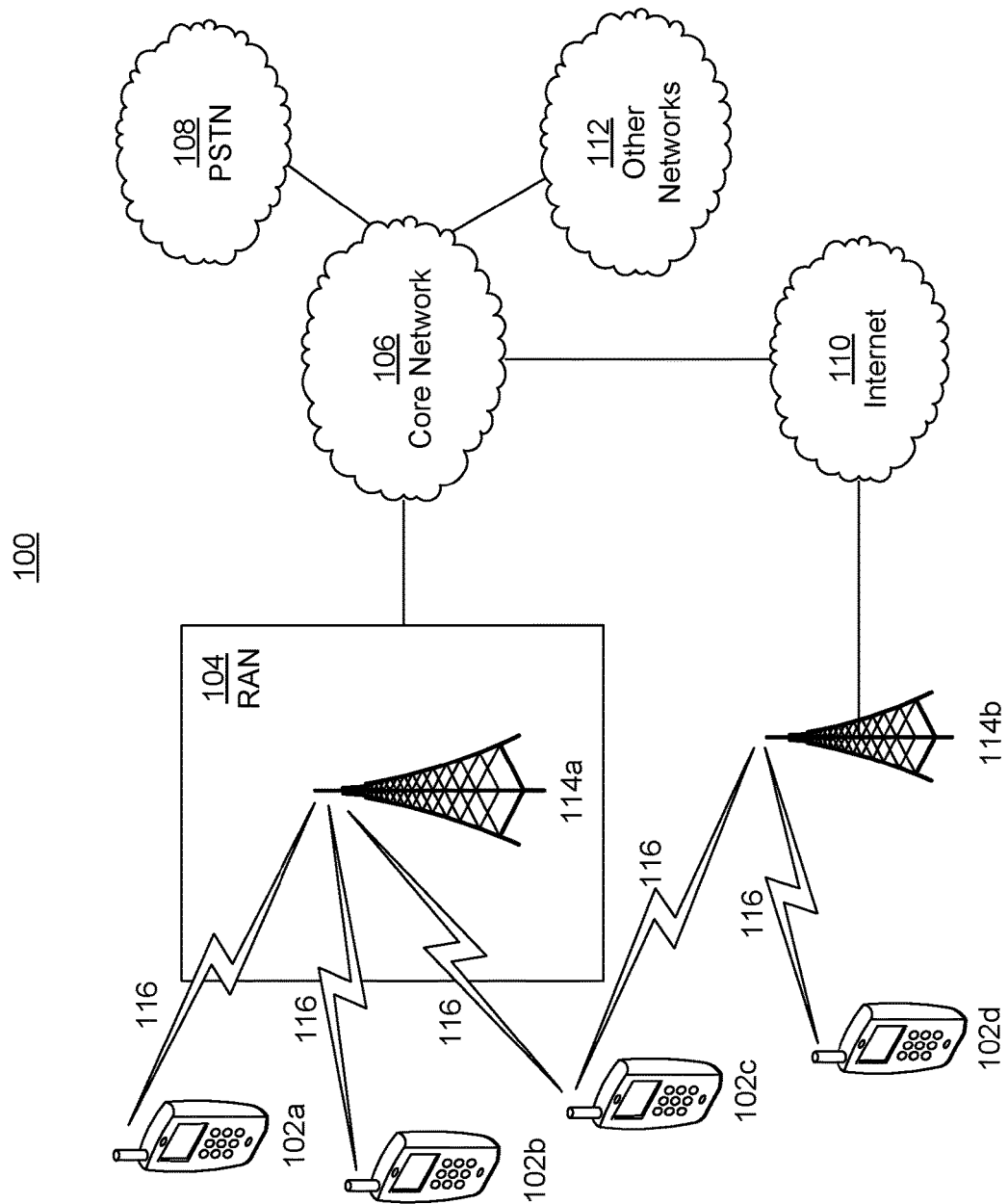
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
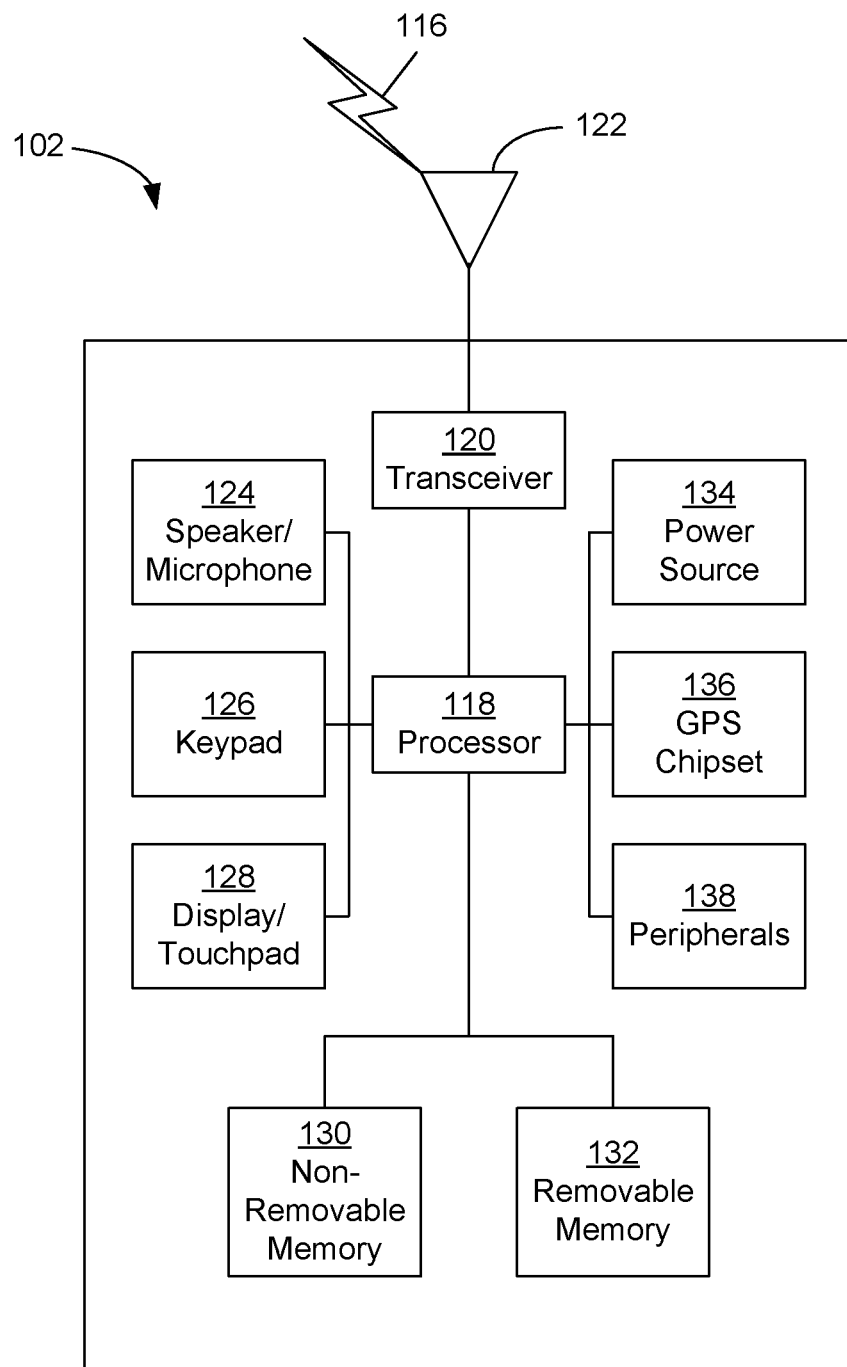
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
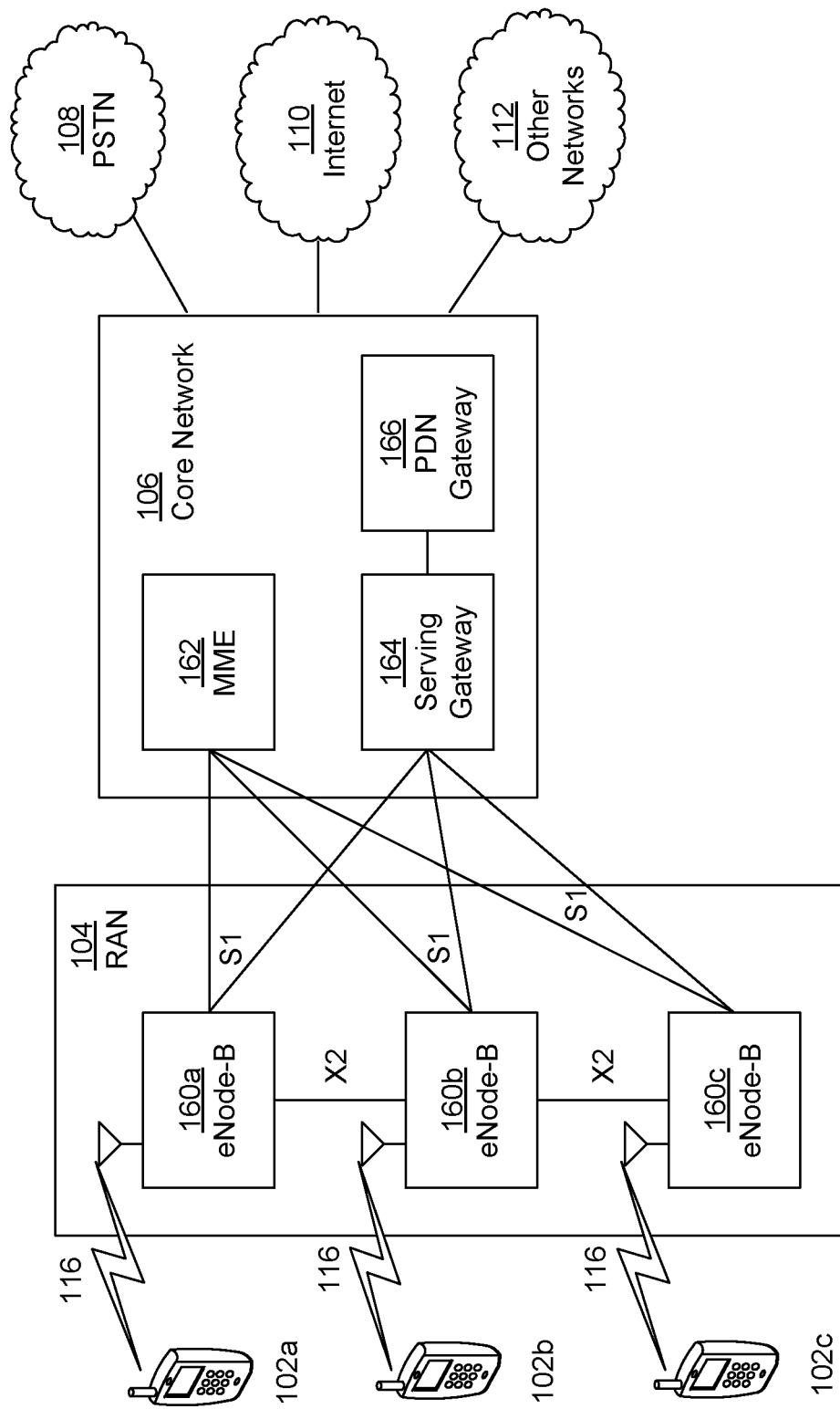
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
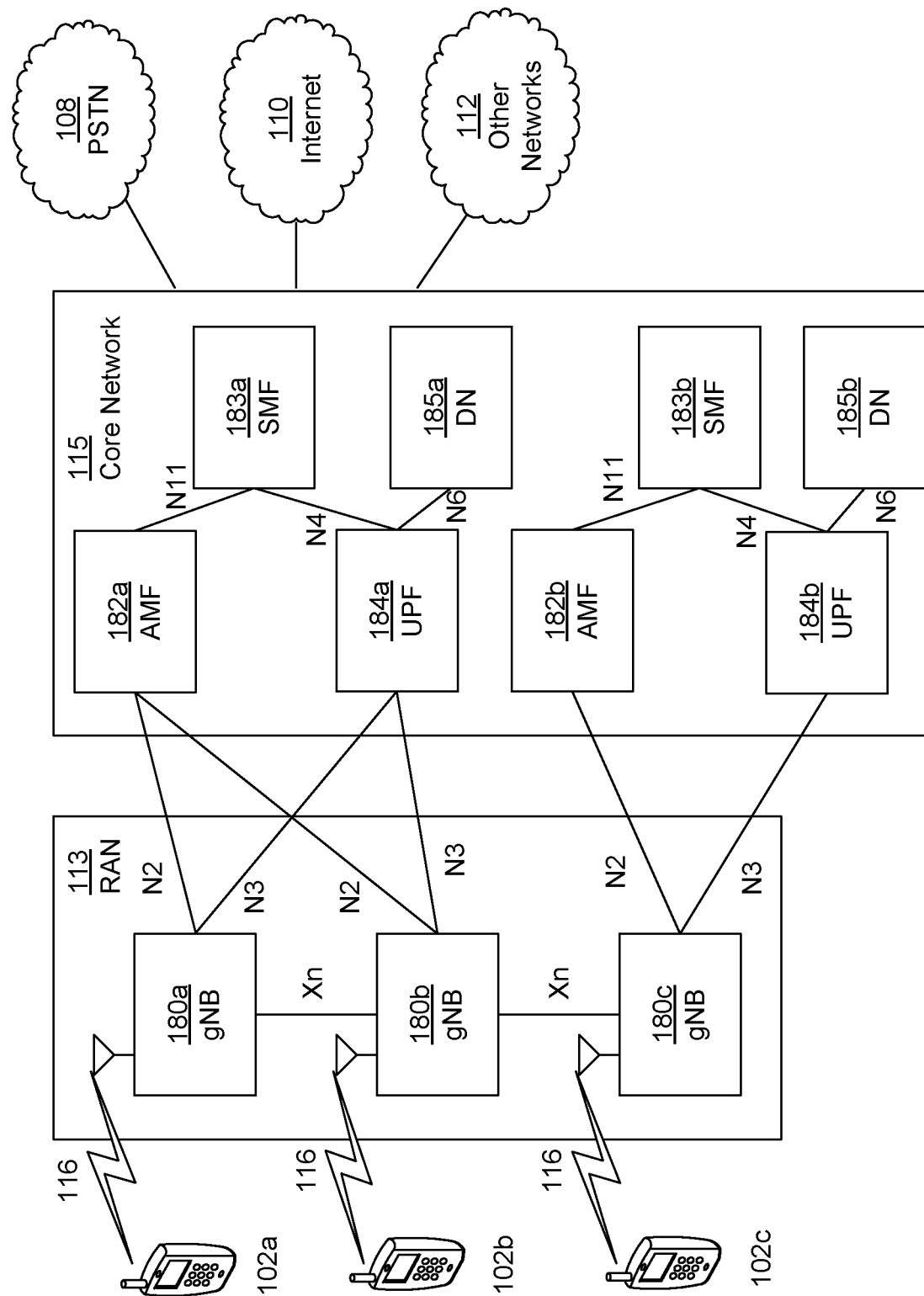
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antenna ports) may be used by the emulation devices to transmit and/or receive data.

In wireless technologies (e.g., cellular and/or WLAN), an RF front-end may be a mix of passive and active components. For example, passive components may include Rx antenna ports, Tx/Rx path switches, and/or filters. Passive components may require a relatively low amount of power in order to function. Active components may require a relatively high amount of power in order to function. For example, an oscillator used to tune to a carrier frequency, a low noise amplifier, and/or A/D converters in a receive (e.g., Rx) path may be active components.

RF circuitry that can process received RF waveforms may be used. The RF waveforms may be collected through an antenna port front-end by a receiving device in the absence of an active power supply. For example, a device may harvest energy from a received RF waveform to run circuitry components used to process signals. Passive receivers may use RF components (e.g., Schottky diodes or micro electro-mechanical systems (MEMS) RF transformers) to implement the functionality used for voltage amplification, multiplication, and/or signal rectification. Passive receivers may operate in the antenna port far-field and may support relatively large link budgets. Passive receivers may receive radio signals over significant distances. As used herein, the terms passive receiver and zero-energy receiver may be used interchangeably. As used herein, the terms energy harvester, energy harvesting passive receiver and energy receiver may be used interchangeably.

Figure 2:
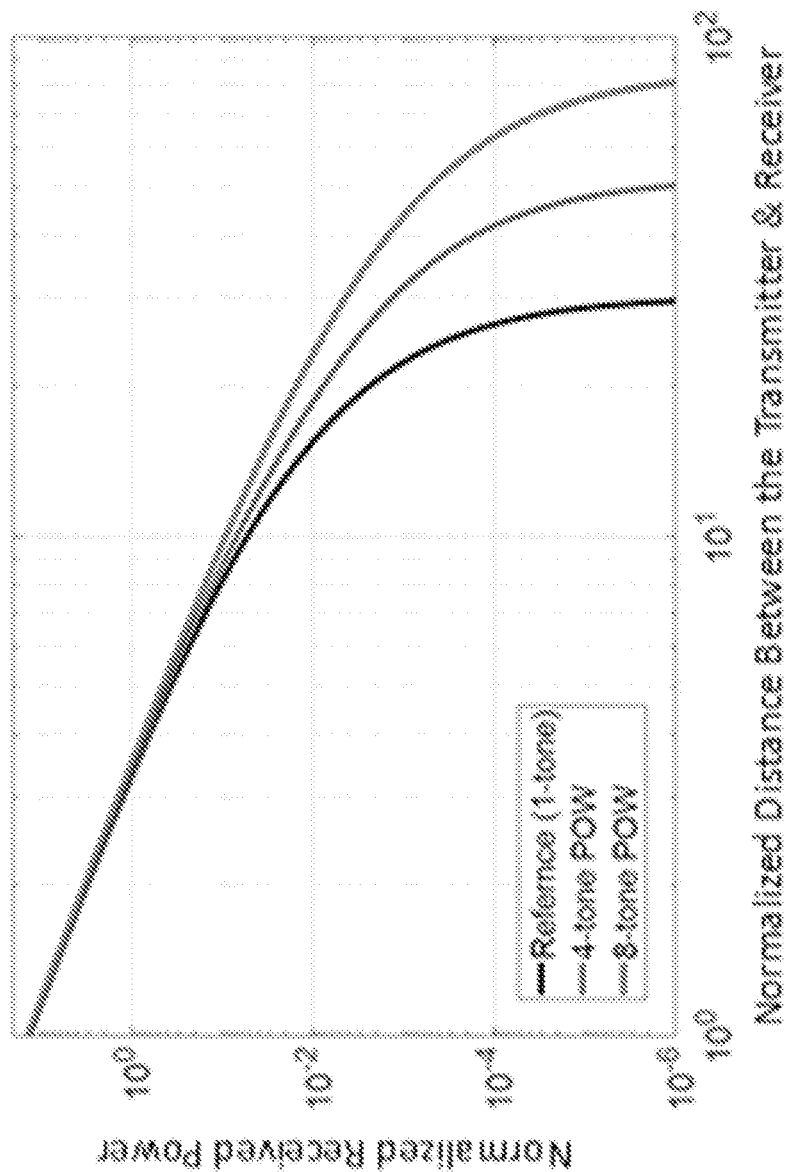
FIG. 2 is an example graph showing power received by a passive receiver (e.g., a diode rectifier-based energy harvester) as a function of distance from a transmitter and a transmitted waveform type.

Operational range and/or energy harvesting efficiency may be characteristics of a passive receiver. The power received by a passive receiver (e.g., a diode rectifier-based energy-harvesting passive receiver) as a function of distance from a transmitter and a type of transmitted waveform is illustrated in FIG. 2. For a desired received power level, the operational distance may be optimized by selecting a parameter (e.g., a number of tones or sub-carriers in an OFDM signal) of, for example, a power optimized waveform (POW). The operational range of the energy receiver may be increased by increasing the number of tones used in the transmitted POW and/or increasing the PAPR of the POW.

Figure 3:
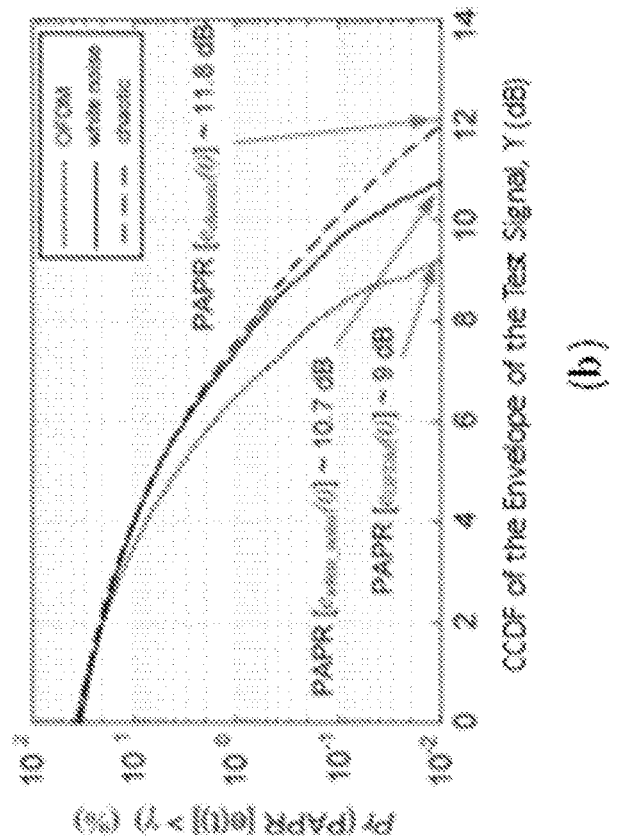
FIG. 3 shows example graphs showing conversion efficiency of a passive receiver (e.g., a diode rectifier-based energy-harvesting passive receiver) as a function of received power and a type of received waveform.
Figure 3:
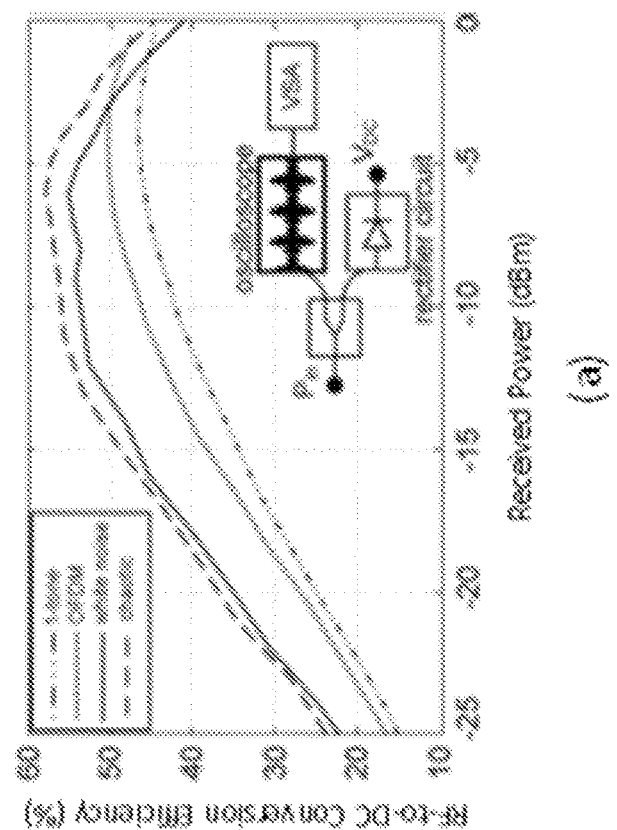

The efficiency of a passive receiver (e.g., a diode rectifier-based energy-harvesting passive receiver) as a function of received signal power and the type of received signal is illustrated in FIG. 3. As shown in graph (a) of FIG. 3, a highest level of RF-to-DC conversion efficiency may be achieved with a chaotic signal. A chaotic signal may have a continuous spectrum and/or may deliver high PAPR (e.g., compared to a pseudo-random sequence with a discrete spectrum). PAPRs of various test signals are shown in graph (b) of FIG. 3. As shown in graph (b) of FIG. 3, a chaotic signal may deliver the highest PAPR.

Figure 4:
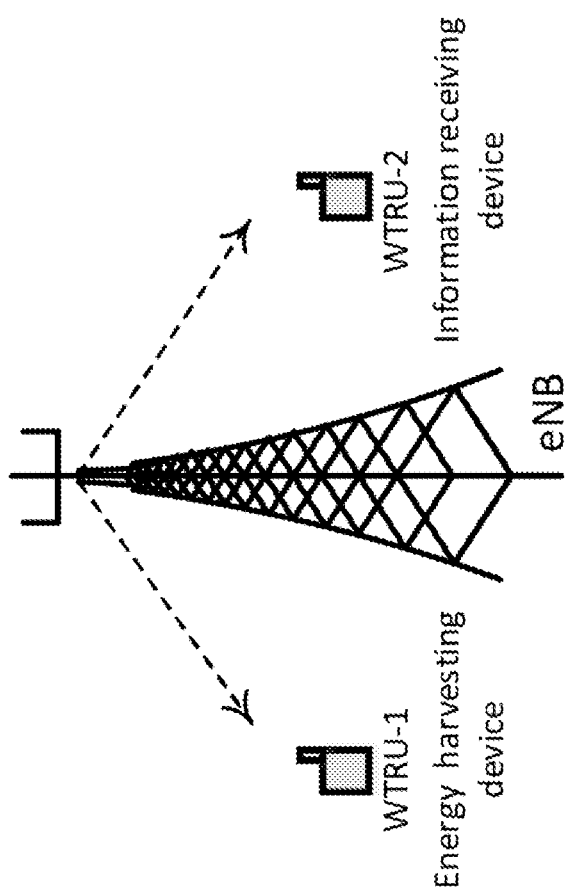
FIG. 4 shows an example of concurrent delivery of energy and information to an energy harvester and an information receiver.

FIG. 4 shows an example of concurrent delivery of energy and information to an energy harvester and an information receiver. As shown in FIG. 4, an eNB may service two mobile users. One of the mobile devices (e.g., WTRU-1 shown in FIG. 4) may be in an energy harvesting mode, while the other mobile device (e.g., WTRU-2) may be in an information receiving mode. The eNB may transmit an appropriate signal that can concurrently provide energy harvesting for WTRU-1, while enabling information reception for WTRU-2 (e.g., in the same band). The eNB may maximize energy harvesting for WTRU-1, for example given a prespecified fixed information requirement for WTRU-2.

Figure 5:
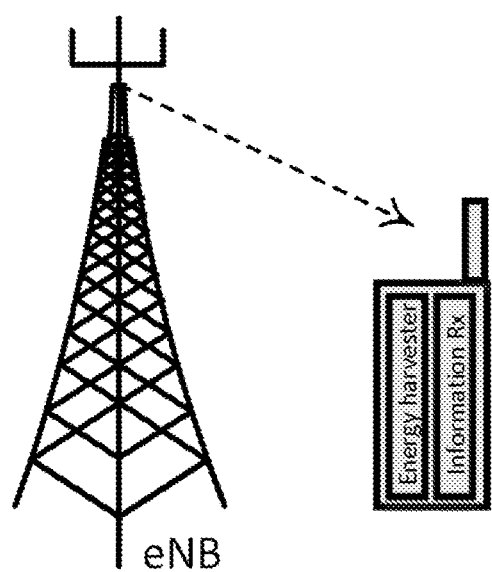
FIG. 5 shows an example of concurrent delivery of energy and information to an energy harvester and an information receiver collocated in a single device.

FIG. 5 shows an example of concurrent delivery of energy and information to an energy harvester and an information receiver collocated in a single device. The system shown in FIG. 5 may be similar to the system shown in FIG. 4. As shown in FIG. 5, an energy harvester and an information receiver may be collocated in the same device. Collocating the energy harvester and the information receiver in the same device may maximize energy harvesting for a fixed information delivery rate requirement and/or may maximize the rate of information delivery for a fixed energy transfer rate requirement.

Figure 6:
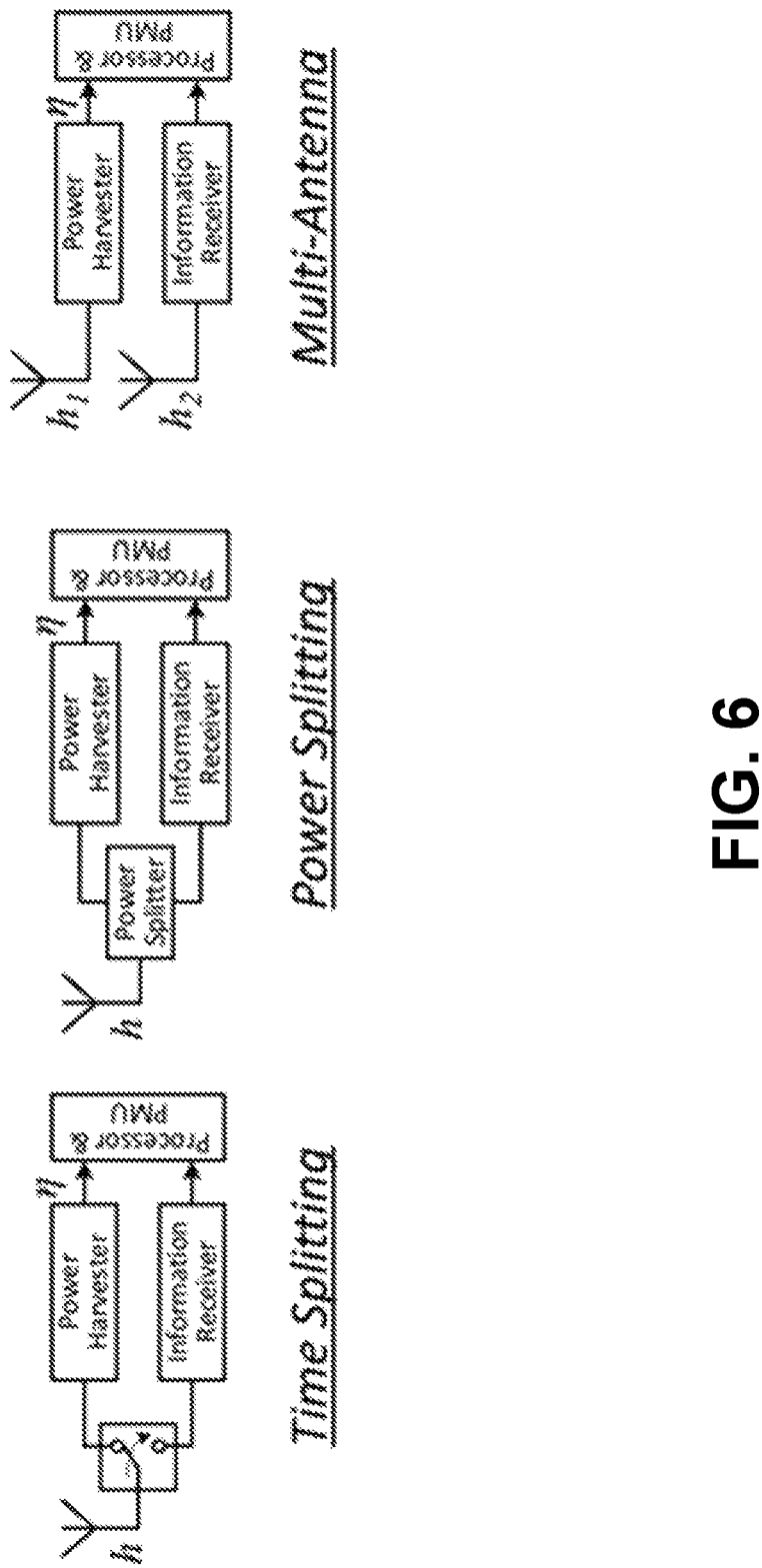
FIG. 6 shows example antenna port interfaces for an energy harvester and an information receiver collocated in the same device.

The information requirement for the example shown in FIG. 5 may be obtained by a power split and/or time split between the information receiver and the energy harvesting receiver, and/or by having individual antenna ports for the information receiver and the energy receiver as illustrated in FIG. 6. FIG. 6 shows example antenna port interfaces for an energy harvester and an information receiver collocated in the same device.

A transmitter may minimize a peak average to power ratio (PAPR) (e.g., in legacy communication systems). Minimizing PAPR may maximize power amplifier efficiency and may minimize unwanted signal distortions. A receiver (e.g., a legacy information receiver) may be expected to receive signals that have relatively low PAPR. The energy harvesting efficiency of a device may depend on the PAPR of the received signal. A higher received PAPR may result in higher energy harvesting efficiency. There may be (e.g., in legacy communication systems) an energy to information rate tradeoff (e.g., an inherent tradeoff) associated with an eNB that is concurrently serving a heterogeneous mix of two or more energy harvesting and information receiving devices. These devices may be in spatial proximity to one another, collocated in a single device, and/or situated anywhere in a cell. A maximized rate of information received may be optimal for a first class of devices, while a maximized amount of energy harvested may be optimal for a second class of devices. It may be difficult to design a waveform that maximizes both the rate information received and the amount of energy harvested.

Implementations disclosed herein may include one or more of the following. Energy harvesting efficiency may be maximized for an energy harvester without degrading performance of an information receiver. Time domain and/or frequency domain implementations may be disclosed herein. An auxiliary signal (e.g., a PAPR enhancing auxiliary transmission (e.g., Tx) signal) may be generated. An auxiliary signal (e.g., a PAPR enhancing auxiliary Tx signal) may be a signal that may be used to enhance the PAPR of a received signal, and may be an information bearing signal and/or a noise sequence (e.g., pseudo random noise, chaotic noise, etc.). An auxiliary signal (e.g., an auxiliary Tx signal) may be described for adapting the PAPR of an Rx signal, for example where energy harvesting efficiency is to be maximized and a link quality is unknown or is partially known. An Rx signal may be a composite (e.g., base and auxiliary) Tx signal received by one or more information and/or energy receivers. A distributed framework for designing an Rx signal of a prespecified PAPR using two or more PAPR enhancing auxiliary Tx signals transmitted from two or more antenna ports may be used. An impact of the PAPR enhancing auxiliary Tx signals on the information receiver's performance may be mitigated.

Auxiliary Tx signals may be transmitted. For example, auxiliary Tx signals may be transmitted using a time-domain implementation using a single transmit antenna port. The term antenna port herein may refer to a logical antenna or a physical antenna. For example, as shown in FIG. 4, an eNB using a (e.g., a single) antenna port may use the same band to concurrently transmit information to an information receiver (e.g., WTRU-2 shown in FIG. 4) and transfer energy to an energy harvester (e.g., WTRU-1 shown in FIG. 4). The transmitter may perform one or more of the following in order to accomplish concurrent energy and information transfer.

Figure 7:
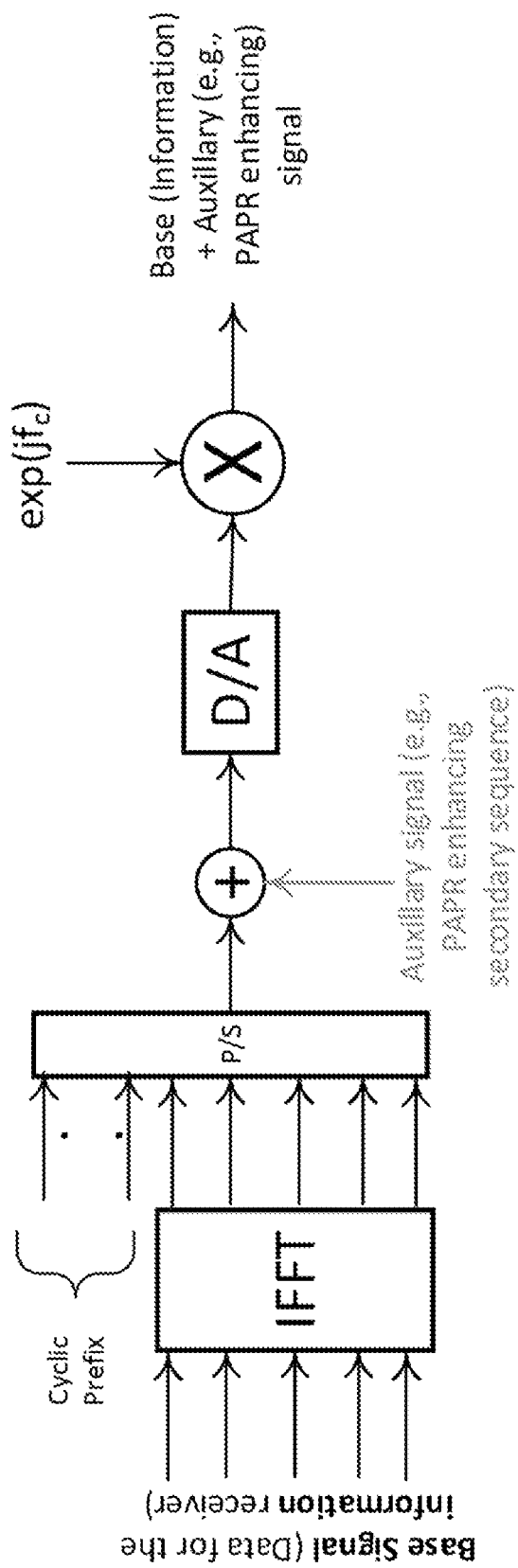
FIG. 7 shows an example generation of a signal in the time domain for concurrent delivery of energy and information (e.g., OFDM based).
Figure 8:
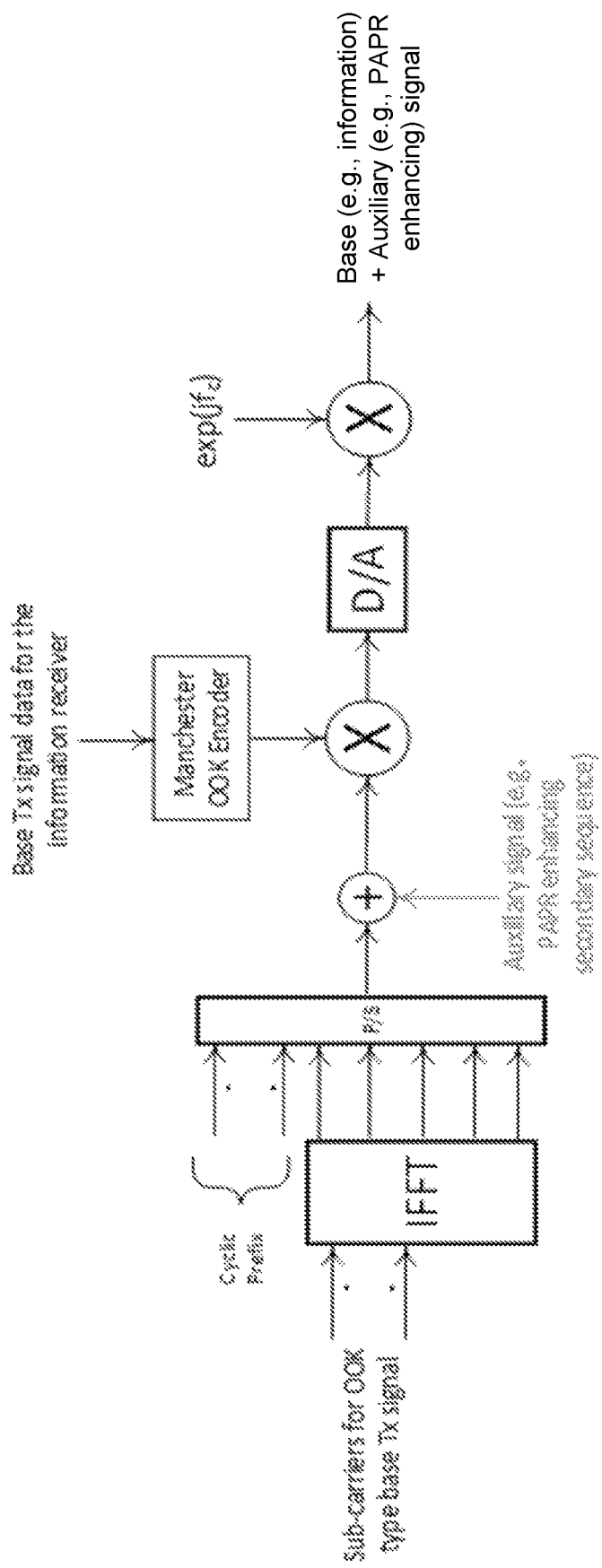
FIG. 8 shows an example generation of a base on-off keyed (OOK) type signal and a peak-to-average power ratio (PAPR) enhancing auxiliary signal in the time domain for concurrent delivery of energy and information (e.g., OFDM based).

For a fixed information sequence to be transmitted to the information receiver (e.g., WTRU-2 shown in FIG. 4), the transmitter may select an appropriate auxiliary Tx signal such that the resulting PAPR of the combined information bearing and the auxiliary Tx signal (e.g., that is eventually transmitted) may be maximized. For example, the transmitter may select a PAPR enhancing auxiliary sequence that may be a pseudo random noise sequence, a chaotic sequence or any other noise sequence. FIG. 7 shows an example generation of a signal in the time domain for concurrent delivery of energy and information (e.g., OFDM based). An example of generating and enhancing the PAPR of a signal in the time domain for concurrent delivery of energy and information (e.g., OFDM based) is illustrated in FIG. 8. For example, the signal in FIG. 8 may be an on-off keyed (OOK) signal or a Manchester encoded OOK signal (e.g., or any other type of signal where the information is modulated using amplitude shift keying, phase shift keying or pulse position keying).

The transmitter may choose an information sequence and an auxiliary Tx signal (e.g., a PAPR enhancing sequence) jointly (e.g., such that the combined signal maximizes PAPR).

Figure 9:
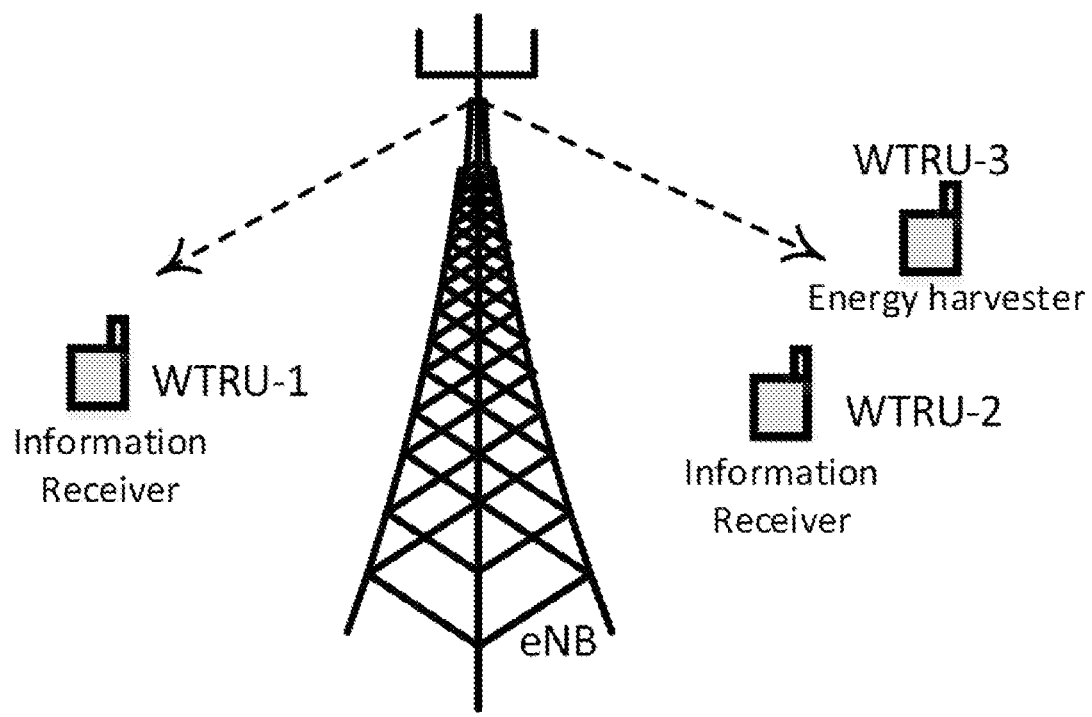
FIG. 9 shows an example of leveraging information sequences for multiple receivers to provide an implicit PAPR maximizing signal for an energy receiver.

The transmitter (e.g., eNB) may schedule a set of information receivers such that the combined information signal appears as a high PAPR signal to the energy harvesting receivers. FIG. 9 shows an example of leveraging information sequences for multiple receivers to provide an implicit PAPR maximizing signal for an energy receiver. As shown in FIG. 9, the information receivers WTRU-1 and WTRU-2 may be scheduled for receiving information by the eNB, while energy harvesting device WTRU-3 may leverage the combined information signal for energy harvesting. An explicit PAPR enhancing sequence (e.g., as shown in FIG. 7) may not be created. In the example shown in FIG. 9, unless the subcarriers for information receivers WTRU-1 and WTRU-2 are mutually exclusive, the eNB may signal the information of WTRU-1 to WTRU-2 and/or WTRU-2 to WTRU-1 (e.g., as in a multi-user superposition transmission (MUST)). The signaled information may include, for example, modulation types/orders used by WTRU-1 and WTRU-2 and/or a power allocation ratio (e.g., if WTRU-1 and WTRU-2 are using the same set of time/frequency resources). For example, the eNB may signal the information to enable the information receivers to decode interference free information.

Figure 10:
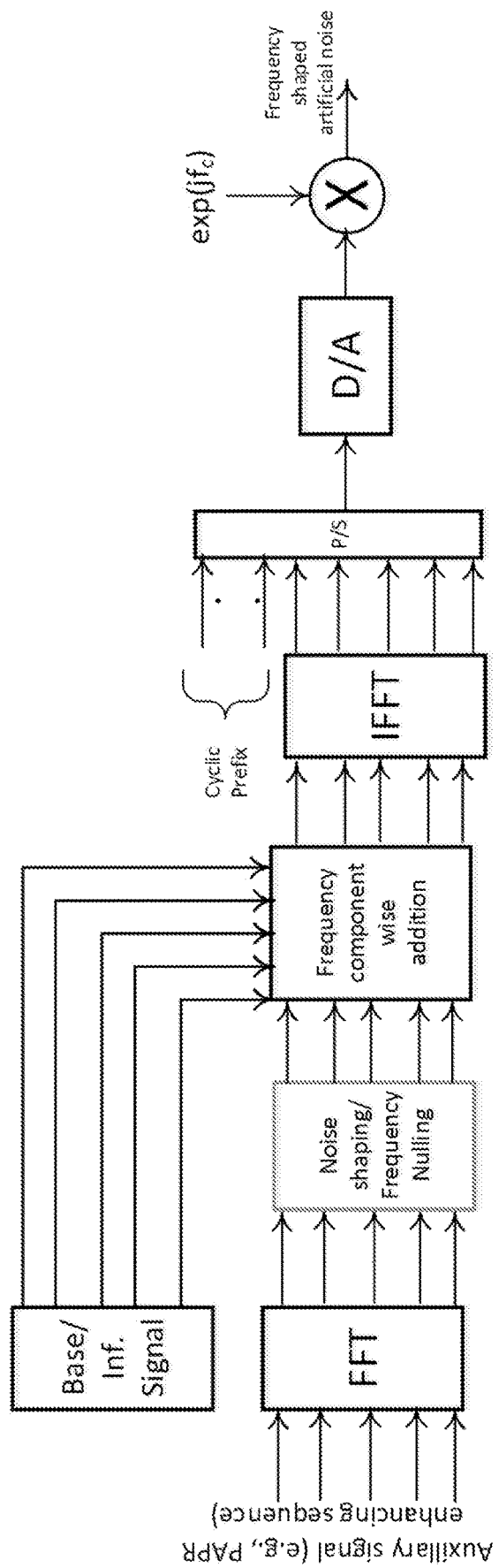
FIG. 10 shows an example generation of a signal in the frequency domain for concurrent delivery of energy and information (e.g., OFDM based), where I(f) may be a base/information signal and an output of a noise shaping block may be $X_N(f)$.

Auxiliary Tx signals may be transmitted using a frequency-domain implementation using a (e.g., a single) transmit antenna port, for example as shown in FIG. 10. FIG. 10 shows an example generation of a signal in the frequency domain for concurrent delivery of energy and information (e.g., OFDM based), where I(f) may be a base/information signal, and an output of a noise shaping block may be $X_N(f)$. A time domain noise sequence may be converted to the frequency domain, noise shaped, and converted back to the time domain, for example using an inverse fast Fourier transform (IFFT). A noise sequence may be, for example, a pseudo-random noise sequence used in spread-spectrum communication systems. Noise shaping in the frequency domain may refer to, for example, filtering. X(t) may be the auxiliary signal (e.g., PAPR enhancing Tx signal), and X(f) may denote its fast Fourier transform (FFT). The PAPR enhancing signal may be noise shaped by making desired frequency components have a desired power, phase or other attribute. g(f) may be the desired frequency response (e.g., that incorporates specific requirements and/or constraints at different spectral components $f_k$ (k=1, 2, . . . ) such as power, phase, spectral leakage etc.). The noise shaped sequence in the frequency domain, $X_N(f)$, may be $X_N(f)=X(f)g(f)$. The auxiliary Tx signal to enhance the POW efficiency may be transmitted and/or modified on a per subcarrier level, or per two or more subcarriers. I(f) may be a base Tx signal (e.g., an information bearing signal). The input to the IFFT may be the sum of the signal $X_N(f)+I(f)$, e.g. as shown in FIG. 10.

Figure 11A:
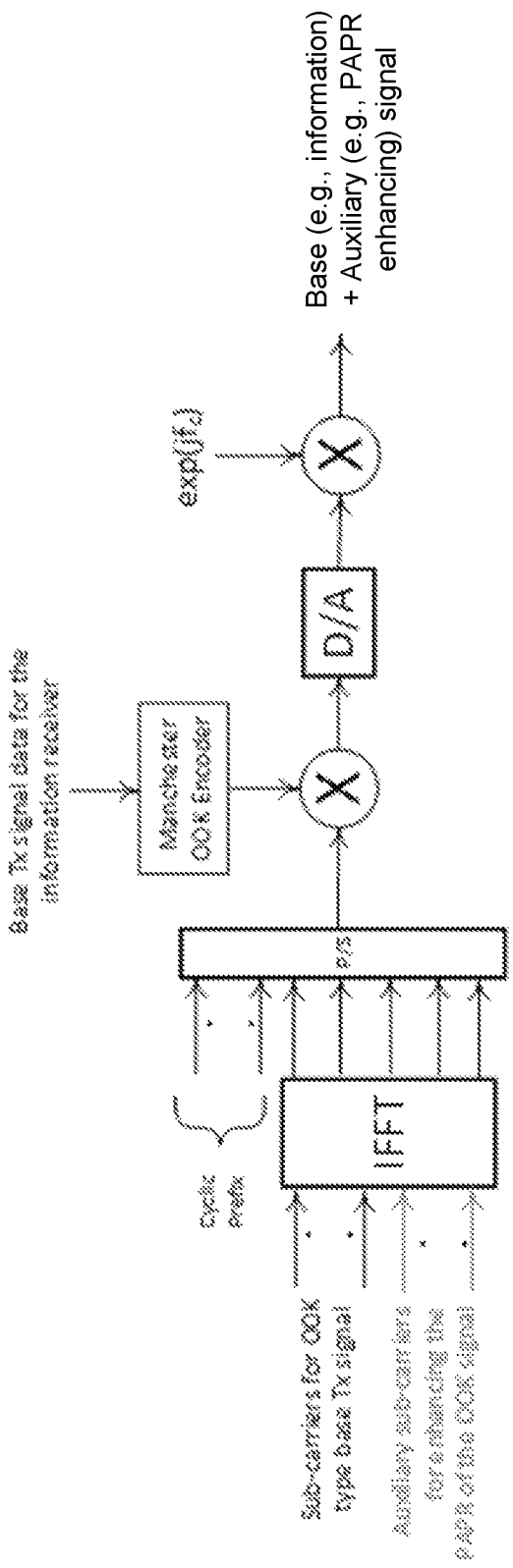
FIG. 11A shows an example generation of a base OOK type signal and a PAPR enhancing auxiliary signal in the frequency domain for concurrent delivery of energy and information (e.g., OFDM based).

FIG. 11A shows an example generation of a base OOK type signal and a PAPR enhancing auxiliary signal in the frequency domain for concurrent delivery of energy and information (e.g., OFDM based). A frequency-domain implementation for generating and enhancing the PAPR of a signal may be illustrated in FIG. 11A. For example, the signal in FIG. 11 may be an on-off keyed (OOK) signal or a Manchester encoded OOK signal (e.g., or any other type of signal where the information is modulated using amplitude shift keying, phase shift keying or pulse position keying). A base Tx signal may be constructed by, for example, binary amplitude or phase shift keying a (e.g., a single) sub-carrier. The PAPR of the transmitted signal may be optimized by, for example, binary amplitude or phase shift keying a POW. One or more sub-carriers (e.g., the auxiliary sub-carriers shown in FIG. 11A) may be used to construct a POW with desired characteristics.

Figure 11B:
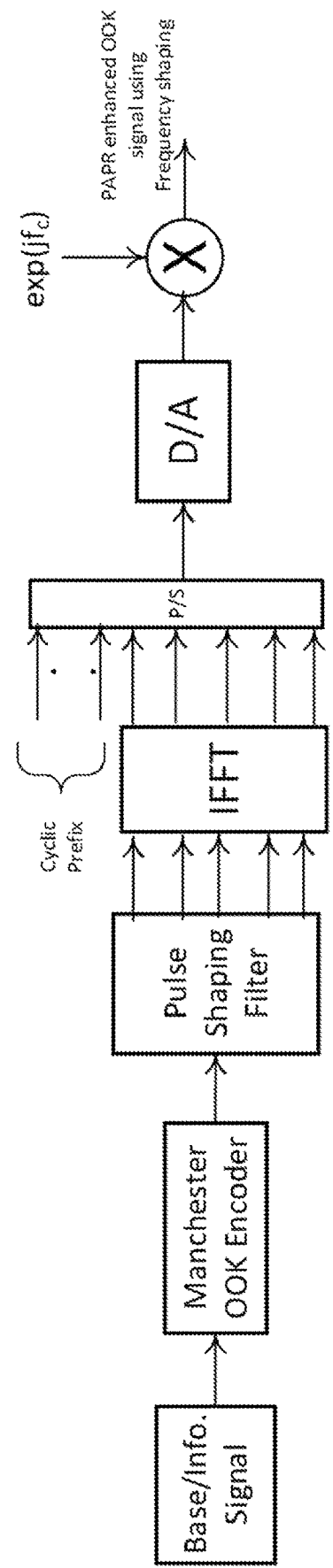
FIG. 11B shows an example generation of a PAPR enhanced base OOK type signal using frequency domain pulse shaping in OFDM-based systems.

One or more auxiliary signal high PAPR characteristics may be overlaid over a base information signal, for example as shown in FIG. 11B. The base information signal may be, for example, a Manchester encoded OOK (e.g., or any other type of modulation and encoding information signal). The base information signal may be generated and encoded in the frequency domain. A pulse shaping filter (e.g., combined with up-sampling) may determine the PAPR characteristics of the signal. An IFFT module may convert the PAPR enhanced signal into the time domain. The pulse shaping filter may be applied to the time domain signal, for example after the IFFT module.

Figure 12:
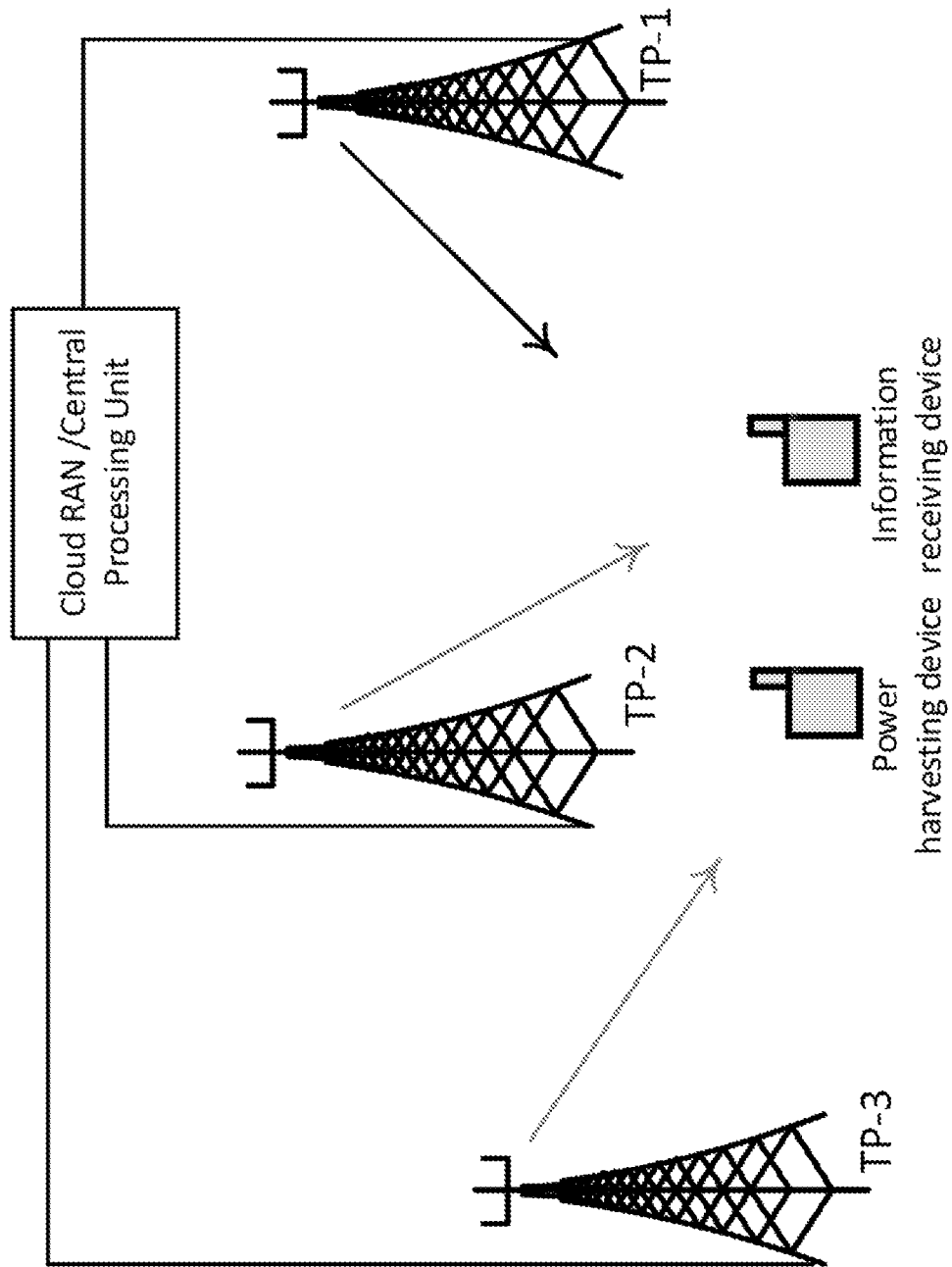
FIG. 12 shows an example of base transmission signal and auxiliary signal generation using multiple antenna ports (e.g., or multiple eNBs), where TP may denote a transmission point.

Multiple transmit antenna ports may be used. FIG. 12 shows an example of base transmission signal and auxiliary signal generation using multiple antenna ports (e.g., or multiple eNBs), where TP may denote a transmission point. In FIG. 12, there may be multiple antenna ports collocated in an (e.g., a single) eNB and/or distributed as transmission points (TPs) across multiple eNBs. One or more (e.g., all) TPs may be connected to a central cloud RAN. A base Tx signal (e.g., an information bearing signal) may generated using a first set of one or more eNBs, antenna ports, or TPS. An auxiliary Tx signal (e.g., a PAPR enhancing auxiliary Tx signal) may be generated using a second set of one or more eNBs, antenna ports, or TPs. The first set may be mutually exclusive with the second set. For example, as shown in FIG. 12, TP-1 may generate the base Tx signal, while TP-2 and TP-3 may generate the auxiliary Tx signal.

Figure 13:
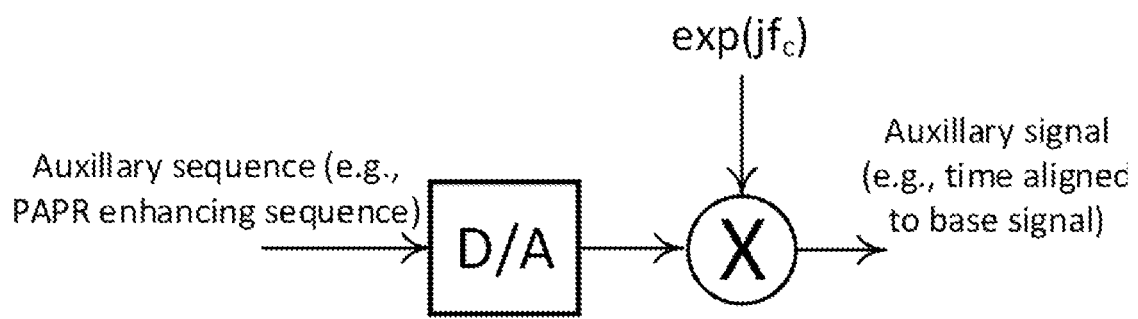
FIG. 13 shows an example auxiliary signal generation at a transmission point.

The generation of the base Tx signal (e.g., the information bearing signal) may be similar to the legacy scheme. Based on the position of an energy harvesting WTRU, the cloud RAN may activate (e.g., only) a set S of eNBs and/or TPs that have high spatial gains and/or PAPR reception gains to the energy harvesting WTRU. The auxiliary Tx signal may be generated by the eNBs and/or TPs in set S that are symbol- and/or subframe-aligned to the eNB that generates the base Tx signal, for example for effective interference cancellation at the information receiver. An example of auxiliary Tx signal generation at a TP may be seen in FIG. 13.

A desired auxiliary Tx signal (e.g., a PAPR enhancing signal) may the sum of one or more PAPR enhancing signals. One or more of the PAPR enhancing signals (e.g., each PAPR enhancing signal) may be transmitted from a separate antenna port or eNB. FIG. 12 shows an example of multiple TPs jointly serving a power harvesting device and an information receiving device. In a distributed approach for generating a PAPR enhancing signal, individual antenna ports may not generate a very high PAPR signal. Individual antenna ports in the distributed approach may generate a low or moderately high PAPR signal, which may enable efficient operation of infrastructure devices. For example, whether a signal has a low, medium (e.g., moderately high), or high (e.g., very high) PAPR may be determined by the number of sinusoids (e.g., which may be denoted N) used to represent the signal. The PAPR may be equal to 10×log 10(2N). From this formula, in an OFDM system with M subcarriers, a signal composed of N e {1, 2, . . . [M/3]} sinusoids may have a low PAPR, a signal composed of N∈{⌈M/3⌉, . . . , ⌊2M/3⌋} sinusoids may have a medium PAPR, and any other signal may have a high PAPR.

A very high PAPR enhancing signal (e.g., which may be denoted as $y_0$) may be created to be the sum of two moderately high (e.g., or low) PAPR enhancing signals. The two moderately high PAPR sequences may be denoted as $y_1$, $y_2$ respectively. More than two moderately high (e.g., or low) PAPR signals may be used, for example as described herein.

For a sequence (e.g., any sequence) of length K, of a given average power, the upper bound on the PAPR of the sequence may be 10 log K. $y_0$={0,0,1,0,0,0,0,0} may be a sequence of length eight, and the PAPR of this sequence may be equal to the upper bound of 10 log 8 dB=9 dB.

One or more of the following may apply to the PAPR sequences $y_1$, $y_2$. The average power of $y_1$ and the average power of $y_2$ may be equal, and both may be equal to the average power of $y_0$. The PAPR of $y_1$ may be less than the PAPR of $y_0$ (e.g., PAPR $(y_1)$<PAPR $(y_0)$). The PAPR of $y_2$ may be less than the PAPR of $y_0$ (e.g., PAPR $(y_2)$<PAPR $(y_0)$). The PAPR of $y_1+y_2$ may be equal to the PAPR of $y_0$ (e.g., PAPR$(y_1+y_2)$=PAPR $(y_0)$).

$y_1$ may be generated as follows. An index (e.g., an arbitrary index) k may be chosen. k may be less than or equal to K (e.g., k≤K). k may be chosen such that $$y_1[k] = \frac{1}{\sqrt{2}}..$$

For indices (e.g., all other indices) not equal to $$k (e.g., \ell \neq k), y_1[\ell] = \frac{1}{\sqrt{2(K-1)}}$$

may be chosen, where K may be the length of the sequence. $y_2$ may be generated as follows. The index (e.g., the arbitrary index) k may be chosen. k may be less than or equal to K (e.g., k≤K). k may be chosen such that $y_2[k]=y_1[k]$. For other indices (e.g., all other indices) not equal to k (e.g., l≠k), $y_2[l]=-y_1[l]$ may be chosen.

For example, k may be equal to 5 and K may be equal to 8. Therefore, $$y_1 = \frac{1}{\sqrt{2}} \left\{ \frac{1}{\sqrt{7}}, \frac{1}{\sqrt{7}}, \frac{1}{\sqrt{7}}, \frac{1}{\sqrt{7}}, 1, \frac{1}{\sqrt{7}}, \frac{1}{\sqrt{7}}, \frac{1}{\sqrt{7}} \right\}, \text{ and}$$

$$y_2 = \frac{1}{\sqrt{2}} \left\{ \frac{-1}{\sqrt{7}}, \frac{-1}{\sqrt{7}}, \frac{-1}{\sqrt{7}}, \frac{-1}{\sqrt{7}}, 1, \frac{-1}{\sqrt{7}}, \frac{-1}{\sqrt{7}}, \frac{-1}{\sqrt{7}} \right\}.$$

It may be demonstrated that the average power of $y_1$, the average power of $y_2$ and the average power of $y_0$ are equal using the following equation:

$$\left(\frac{1}{8}\right)\sum_{n=0}^{7}|y_1[n]|^2 = \left(\frac{1}{8}\right)\sum_{n=0}^{7}|y_2[n]|^2 = \left(\frac{1}{8}\right)\sum_{n=0}^{7}|y_0[n]|^2$$

It may be demonstrated that the PAPR of $y_1$ is less than the PAPR of $y_0$ and the PAPR of $y_2$ is less than the PAPR of $y_0$ using the following equation:

PAPR($y_1$)=PAPR($y_2$)=10 log 4=6 dB<PAPR($y_0$)

It may be demonstrated that $y_1+y_2=\{0,0,0,0,1, 0, 0,0\}$. Therefore, the PAPR of $y_1+y_2$ may be equal to the PAPR of $y_0$.

A high PAPR sequence of length K may be created to be a sum of M low or moderately high PAPR sequences ($y_1, y_2, \ldots y_M$), e.g. according to the following. The index (e.g., the arbitrary index) k may be chosen. k may be less than or equal to K (e.g., k≤K). k may be chosen such that $y_1[k]=y_2[k]=\ldots y_M[k]=1/(\sqrt{M})$. For other indices (e.g., all other indices) not equal to $$k (e.g., \ell \neq k), y_b[\ell] = -y_{b+1}[\ell] = \frac{1}{\sqrt{M(K-1)}}$$

may be chosen, where K may be the length of the sequence and where b=1,2, ... m−1. For indices not equal to k (e.g., all indices not equal to k), every other sequence may be positive and every other sequence may be negative.

A TP (e.g., each TP) may transmit a moderately high (e.g., or moderately low) PAPR sequence. For example, TP-1 may transmit $y_1$, TP-2 may transmit $y_2$, and TP-3 may transmit $y_3$.

Auxiliary signals may be constructed for multiple TPs according to the following. A TP (e.g., each TP) using an initial seed for generating independent samples $u_1$, $u_2$ (e.g., according to a deterministic function) and an amplitude stretching factor γ may choose a variance scaling factor $a_1$ to generate a PAPR enhancing sequence. The initial seed may be chosen from a uniform distribution in (0,1). A TP (e.g., each TP) may generate an independent sequence. The variance of the sum of the sequences (e.g., as seen by the energy harvesting receiver) from multiple TPs may add up and may lead to high (e.g., desired) PAPR. An information receiver may be aware of one or more (e.g., all) parameters of a TP (e.g., each TP), and may generate the individual sequence of a TP (e.g., each TP) locally. The information receiver may be able to cancel the sum of individual PAPR enhancing signals.

An auxiliary transmission signal (e.g., a PAPR enhancing auxiliary Tx signal) may be constructed. The construction of the auxiliary transmission signal may be signaled. For example, the auxiliary transmission signal may be constructed in the time domain.

Pseudo random noise sequences may be approximately random in the sense that a sequence of noise samples generated may be (e.g., only) determined by an initial seed. For example, the sequence may be determined only by the initial seed if the sequence type and length is known a priori. The initial seed may be preconfigured and/or selected mutually by the transmitter and the information receiver, e.g. instead of the transmitter transmitting (e.g., explicitly transmitting) the entire noise sequence to the information receiver for noise cancellation.

The initial seed may be a deterministic function of one or more parameters, for example one or more OFDM symbols (e.g., intervals), timeslot, subframe, frame, system frame number (SFN), superframe, hyper frame number, a counter, timer value, C-RNTI, G-RNTI, Physical Cell Identity (PCI), Global cell ID, UTC time, etc. A superframe may be, for example, a building block in a hyperframe. For example, the initial seed may be equal to TTI mod 3+PCI.

The deterministic function used to generate the initial seed may be changed by the transmitter (e.g., dynamically or semi-statically), and may be signaled to the WTRU.

The initial 'seed' parameter associated with determining the PN noise sequence for use with a information receiver or energy harvesting receiver may be pre-configured, known, and stored in memory in the WTRU. The transmission characteristics may be signaled and configurable in the WTRU. For example, network node(s) (e.g., MME or eNB) may use control signaling in the form of NAS, RRC, MAC CE or L1 (e.g., DCI) signaling, using a main cellular modem (e.g., when active) to configure and/or indicate transmission formats for the purpose of determining the noise sequence using an information receiver or energy harvesting receiver by a WTRU.

A chaotic sequence may be used because it has the highest energy harvesting efficiency (e.g., among one or more noise sequences). The chaotic sequence may be random (e.g., as in pseudo noise generation). The sequence may be (e.g., may become) deterministic once the initial state is provided. A discrete chaotic sequence may be generated according to the following equation:

$$x_{n+1}=rx_n(1-x_n)$$

where for 3.57<r<4, and the sequences that may be generated for different initial states $x_0$ may be uncorrelated. The initial state of the chaotic sequences may be preconfigured and/or selected mutually by the transmitter and the information receiver. The initial state of the chaotic sequence may be a deterministic function of one or more parameters, for example one or more OFDM symbols (e.g., intervals), timeslot, subframe, frame, system frame number (SFN), superframe, hyper frame number, a counter, timer value, C-RNTI, G-RNTI, Physical Cell Identity (PCI), Global cell ID, UTC time, etc. The information receiver may be able to obtain the initial state of the chaotic sequence using the parameters. The sequence may be generated locally for cancellation of a PAPR enhancing signal.

The initial 'state' parameter associated with determining the chaotic sequence for use with a information receiver and/or energy harvesting receiver may be pre-configured, known, and stored in memory in the WTRU. The transmission characteristics may be signaled and configurable in the WTRU. For example, network node(s) (e.g., MME or eNB) may use control signaling in the form of NAS, RRC, MAC CE or L1 (e.g., DCI) signaling, using the main cellular modem (e.g., when active) to configure and/or indicate transmission formats for the purpose of determining the chaotic sequence using a information receiver or energy harvesting receiver by a WTRU.

A mutually agreed upon look up table containing selected pseudo noise or chaotic sequences may be preconfigured at the transmitter and/or receiver. For example, M may be a size of a lookup table indexed from {1, 2 . . . M}. The transmitter may choose an index from the lookup table. The index may be a deterministic function of one or more parameters, for example: one or more OFDM symbols (e.g., intervals), timeslot, subframe, frame, system frame number (SFN), superframe, hyper frame number, a counter, timer value, C-RNTI, G-RNTI, Physical Cell Identity (PCI), Global cell ID, UTC time, etc. The transmitter may transmit the corresponding pseudo noise or chaotic sequence.

The information receiver may obtain the index of the lookup table based on the deterministic function and the parameters. The information receiver may generate (e.g., locally) a PAPR enhancing signal for cancellation.

The 'index' parameter associated with the lookup table for determining the appropriate pseudo noise or chaotic sequence for use with an information receiver or energy harvesting receiver may be pre-configured, known, and stored in memory in the WTRU. The transmission characteristics may be signaled and configurable in the WTRU. For example, network node(s) (e.g., MME or eNB) may use control signaling in the form of NAS, RRC, MAC CE or L1 (e.g., DCI) signaling, using the main cellular modem (e.g., when active) to configure and/or indicate transmission formats for the purpose of determining the chaotic sequence using a information receiver or energy harvesting receiver by a WTRU.

For example, an auxiliary Tx signal may be constructed in the frequency domain using multiple transmit antenna ports. As shown in FIG. 12, there may be multiple eNBs and/or antenna ports generating the auxiliary Tx signal. The base Tx signal may be generated by a first set of one or more antenna ports and/or eNBs, while the auxiliary Tx signal may be generated by a second set of one or more antenna ports and/or eNBs. The first set and the second set may be mutually exclusive. The base Tx signal generation may follow the legacy implementation.

Figure 14A:
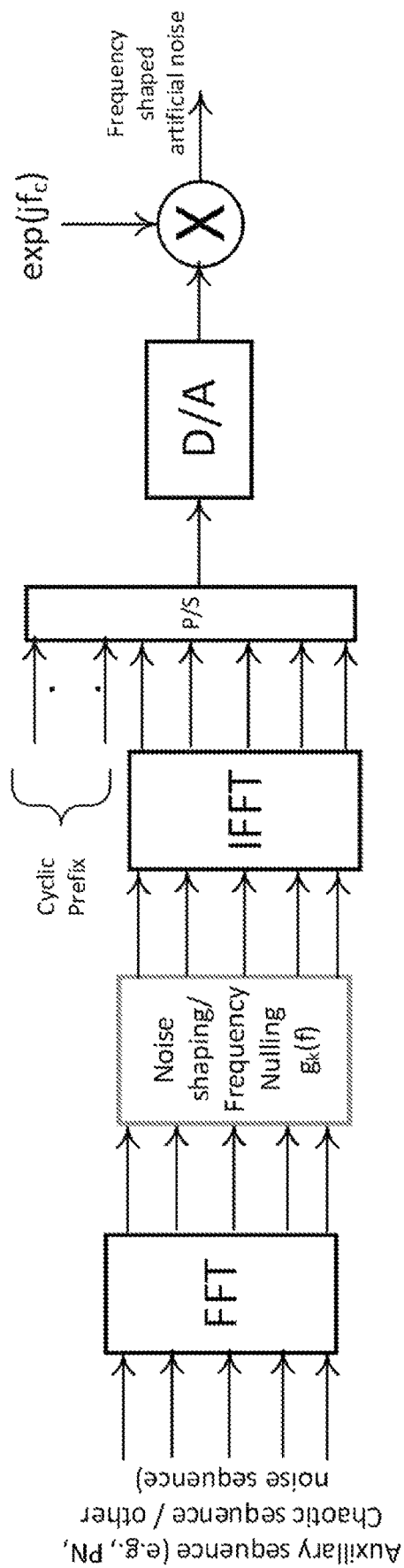
FIG. 14A shows an example of noise shaped PAPR enhancing auxiliary transmission signal generation.

For the auxiliary Tx signal generation, the $k^{th}$ transmission point may be assigned a unique noise shaping function $g_k(f)$. FIG. 14A shows an example of noise shaped PAPR enhancing auxiliary transmission signal generation. For example, in FIG. 14A, $g_k(f)=0$ for $f=f_1,f_2$ while $|g_k(f)|=0.2$ for $f=f_3,f_4$. At the $k^{th}$ transmission point, the frequency domain equivalent of the time domain auxiliary Tx signal may be shaped by the unique noise shaping function $g_k(f)$. The noise shaped auxiliary Tx signal in the frequency domain for the $k^{th}$ transmission point may be $X_N^k(f)=X(f) g_k(f)$ (e.g., where the subscript N in $X_N$ may emphasize noise shaping). Although the auxiliary Tx signal derived from a TP (e.g., a single TP) may not have the desired PAPR characteristics, an auxiliary Tx signal derived from one or more TPs (e.g., all TPs) may provide the desired PAPR characteristics. The energy harvester that receives auxiliary Tx signals from one or more TPs (e.g., all TPs) may receive the desired PAPR enhancing signal.

The noise sequence may be transmitted and/or activated in specific frequencies (e.g., only in specific frequencies). The frequencies may be changed (e.g., dynamically) at a TP. The noise shaping function may be active (e.g., only) for specific frequencies at a particular time instant (e.g., subframe, etc.) at a TP. The noise components for the remaining frequencies at that time instant from the TP may be assumed to be zero. The frequencies in which the noise is active may change (e.g., dynamically) with time (e.g., every 100 ms) for a TP. The frequency hopping pattern over which the noise is active may be preconfigured or signaled (e.g., explicitly) to the information receiver. The noise shaping function $g_k(f)$ at the $k^{th}$ TP may be (e.g., dynamically) changed.

The noise shaping function for determining the appropriate pseudo noise or chaotic sequence for use with an information receiver or energy harvesting receiver may be pre-configured, known, and stored in memory in the WTRU. The transmission characteristics may be signaled and configurable in the WTRU. For example, network node(s) (e.g., MME or eNB) may use control signaling in the form of NAS, RRC, MAC CE or L1 (e.g., DCI) signaling, using the main cellular modem (e.g., when active) to configure and/or indicate transmission formats for the purpose of determining the noise shaping function using a information receiver or energy harvesting receiver by a WTRU.

A narrowband auxiliary signal may be generated. An energy harvesting (EH) device may be capable of (e.g., only capable of) harvesting energy over a bandwidth that is less (e.g., considerably less) than the information channel bandwidth. The EH device may be collocated with an information receiver. The information channel bandwidth may be dedicated to an information receiver or shared amongst more than one information receiver. For example, the EH device may be limited to harvesting energy from a specific 400 KHz band at a time due to, for example, the design of a MEMS RF transformer. The information channel may be configured with a 20 MHz bandwidth.

Figure 14B:
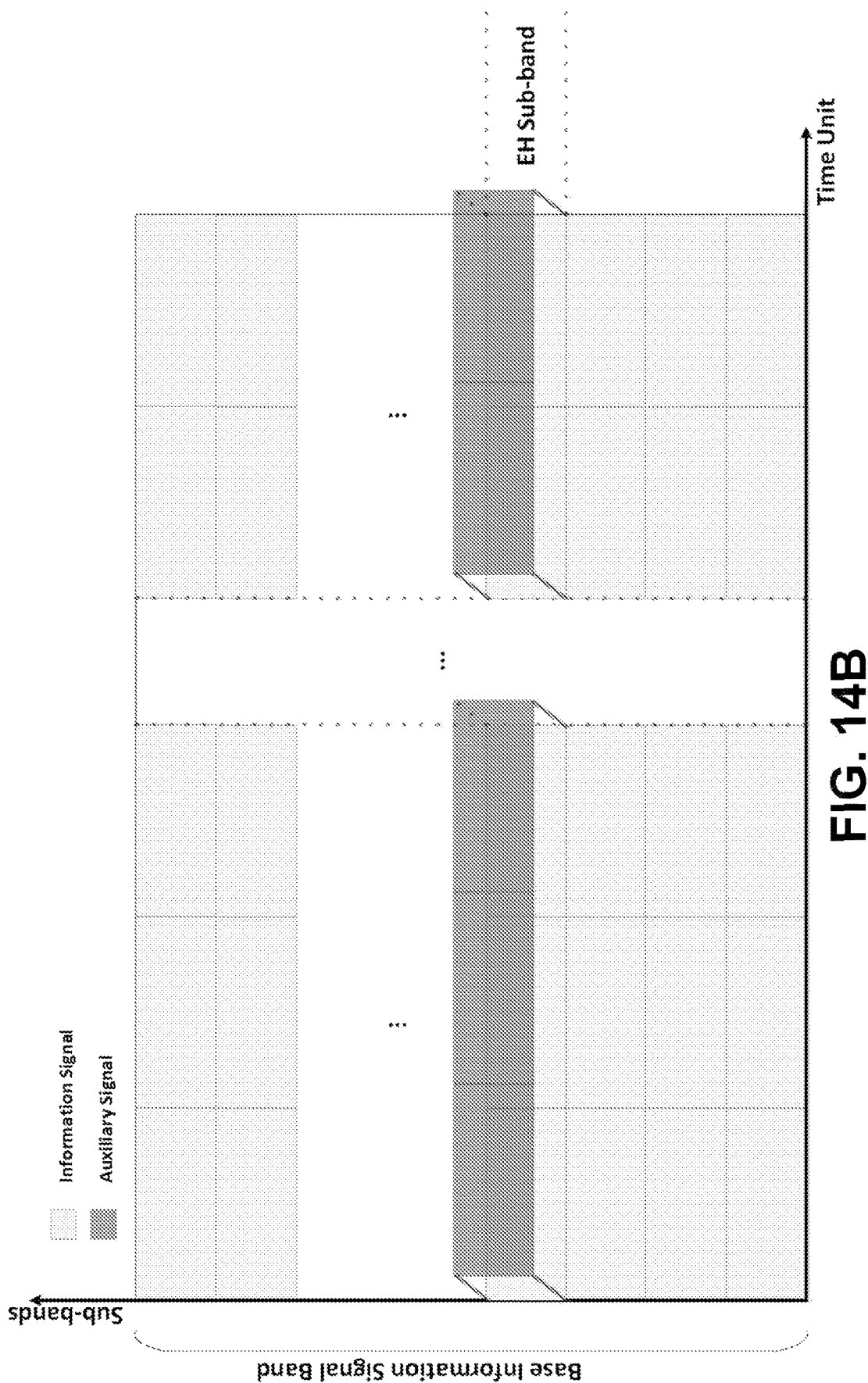
FIG. 14B shows an example of fixed sub-band signal enhancement for PAPR maximization for an energy harvesting (EH) signal.

For the EH device, the sub-band filtered signal (e.g., the energy harvesting band) may not carry fully decodable information, for example since the information signal may span a larger bandwidth than the considered EH bandwidth. The EH device may not receive any information over the filtered sub-band. The EH device may receive a signal that is characterized by a relatively high PAPR (e.g., such that its energy harvesting efficiency is maximized). Due to the variation/randomness in the part of information signal that is carried over the filtered sub-band, the resulting information time-domain signal (e.g., on its own) may not be characterized by a high PAPR. As disclosed herein, an auxiliary signal may be superimposed over the portion of the information signal spanning the frequency sub-band considered by the EH device (e.g., as shown in FIG. 14B). The auxiliary signal may be used to maximize the PAPR of the time-domain signal resulting from the superposition with the information signal part.

One or more characteristics may be considered for narrowband base information signal enhancement using auxiliary signals. The PAPR characteristics of the overall time-domain signal generated at the transmitter may not change significantly, for example given the much smaller bandwidth considered for PAPR enhancement compared to the overall channel/base information signal bandwidth. The transmitter may be, for example, a base station (BS). The PAPR characteristics not changing significantly may maintain the transmitter's power amplifier efficiency. The flexibility in narrowband resources scheduling may allow for backward compatibility with information receivers that do not support advanced auxiliary signal mitigation.

The auxiliary signal may be constructed as disclosed herein. The auxiliary signal may be chosen from a set of predefined signals. For example, the auxiliary signal may be chosen such that the average/minimum PAPR over a set of one or more OFDM symbols, slots, subframes, or frames is maximized. The set of predefined signals may (e.g., also) be chosen such that the PAPR variance is minimized. Depending on the chosen period of optimization (e.g., the period corresponding to the considered number of OFDM symbols/slots/subframes/frames), the selected auxiliary signal may be signaled to the information receiver.

For example, there may be an OFDM system with 100 RBs, where an RB (e.g., each RB) may consist of 12 SCs with sub-carrier spacing (SCS) of 15 KHz, and 2 RBs may be dedicated for EH. A codebook of M vectors may be generated. A vector (e.g., each vector) of length 24 (e.g., 2 RBs×12 SCs) may represent a potential auxiliary signal to augment a base information signal (e.g., in the frequency domain before the IFFT module) and enhance the PAPR of the combined auxiliary and base information signal. The M vectors may be generated randomly using 2' elements that may be obtained according to the following:

$$e_i = 1 - s_i, i \in \{1, 2, \ldots, 2^N\}$$

where $2^N$ may be the base information signal QAM modulation order and $s_i$ may be the base information signal constellation. For an OFDM symbol (e.g., each OFDM symbol), an auxiliary signal vector may be chosen from the codebook. The auxiliary signal vector may be chosen such that the PAPR of the time-domain signal corresponding to the 2 EH dedicated RBs is maximized. A sample PAPR CDF for M∈{1, 5, 10, 50} and assuming QPSK and 16-QAM modulation may be shown in FIGS. 14C and 14D, respectively. An EH device may tune its circuitry to the considered EH sub-band (e.g., the 2 dedicated RBs). An information WTRU may receive information about the sub-band (e.g., the 2 dedicated RBs) used to enhance the base information signal and the parameters that may be used to regenerate (e.g., and/or cancel) the auxiliary signal.

Figure 14C:
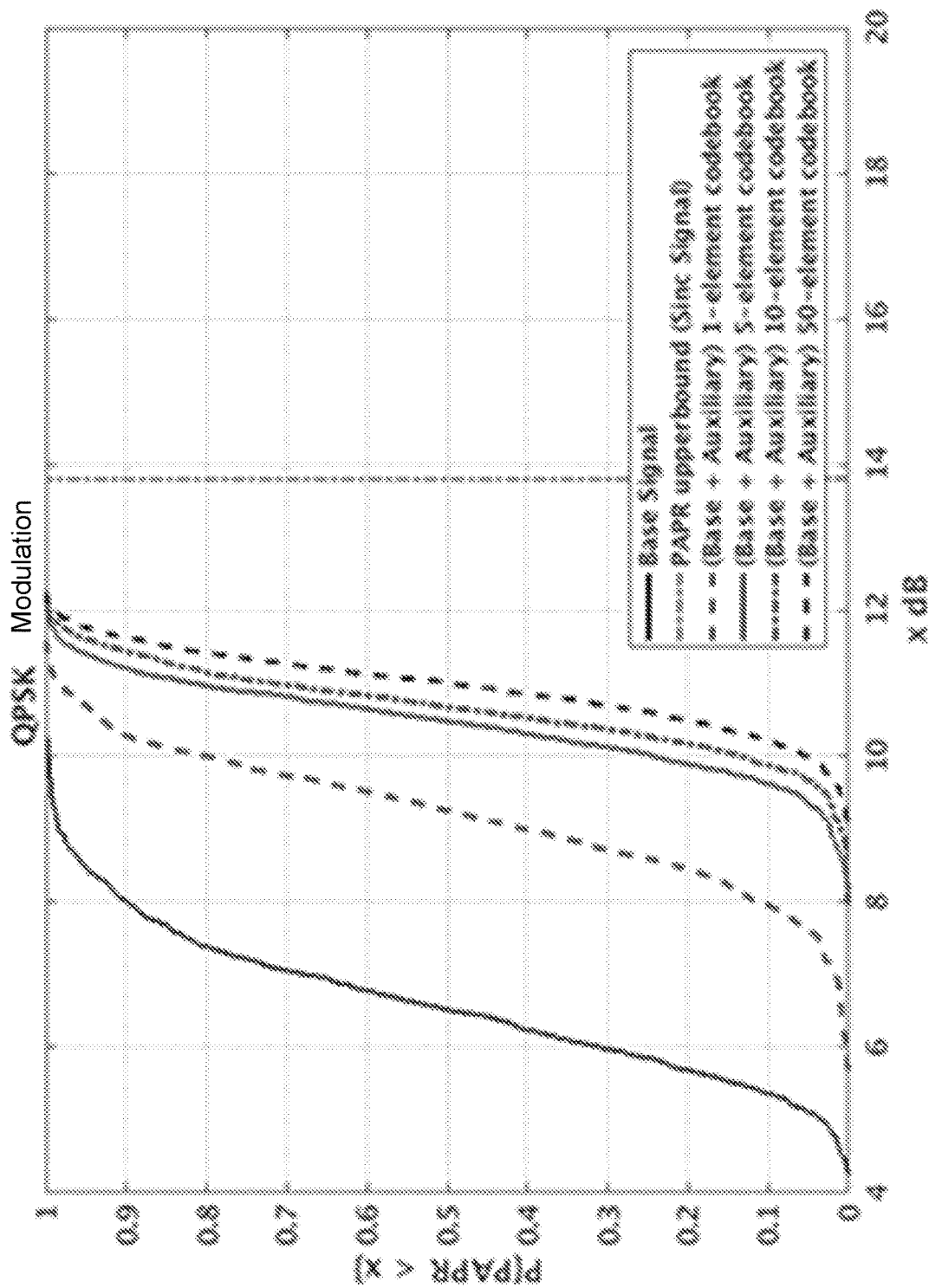
FIG. 14C shows example PAPR CDFs using sample auxiliary signal codebooks (e.g., of length $M \in \{1, 5, 10, 50\}$) and enhancing a QPSK modulated base information signal.
Figure 14D:
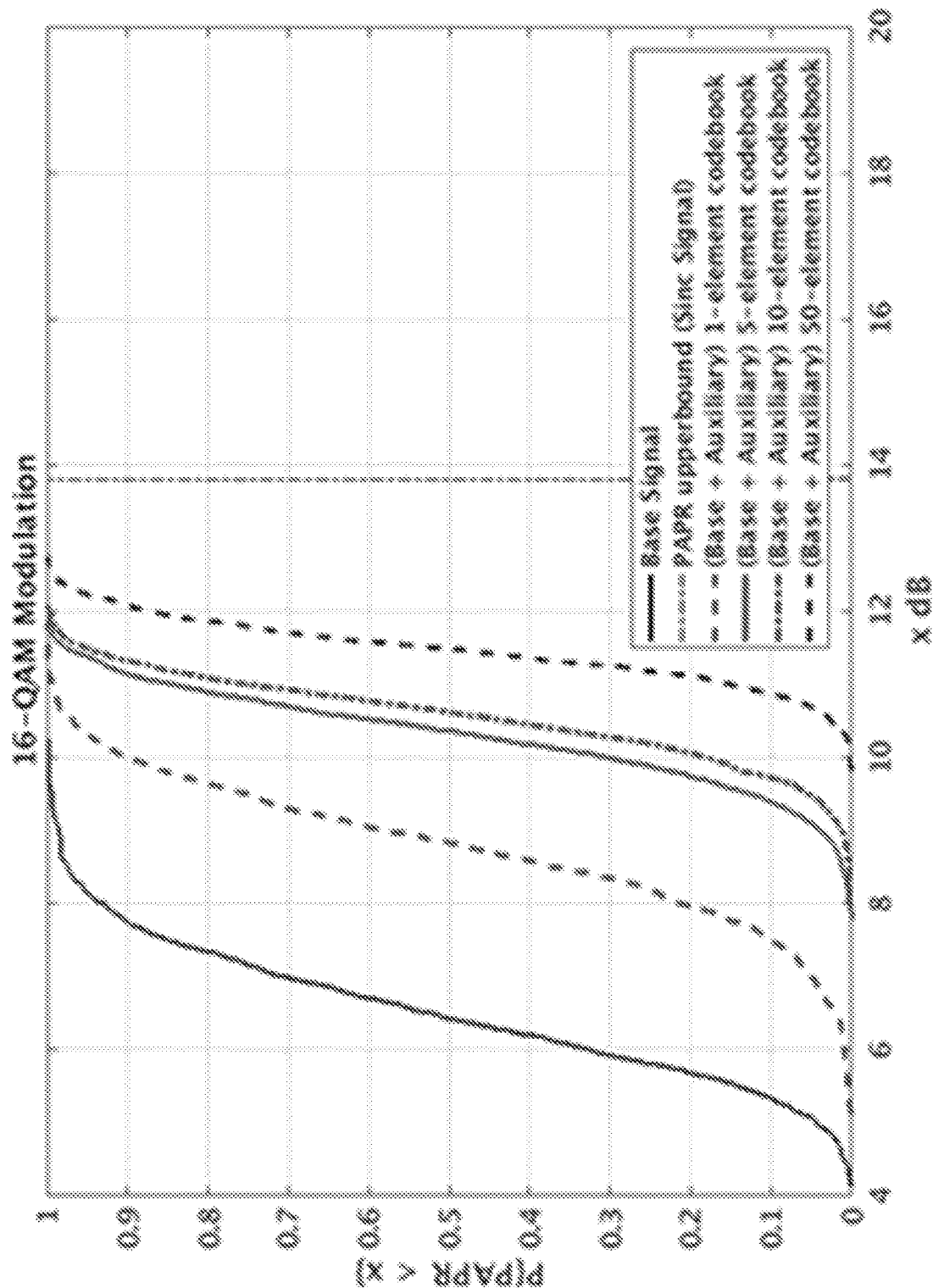
FIG. 14D shows example PAPR CDFs using sample auxiliary signal codebooks (e.g., of length $M \in \{1, 5, 10, 50\}$) and enhancing a 16-QAM modulated base information signal.

The PAPR enhancement gain relationship among different codebook sizes shown in FIGS. 14C and 14D may not be consistent between QPSK and 16-QAM modulation (e.g., due to the random generation of codebooks as described herein). For well-designed codebooks, the PAPR enhancement gain relationship among codebooks of different sizes may be consistent between QPSK and 16-QAM modulation. A higher (e.g., and/or similar) PARP enhancement gain may be expected with respect to the base signal PAPR values (e.g., using a well-designed auxiliary signal codebook of the same size as the randomly generated codebook). As shown in FIG. 14D, the minimum PAPR for a 16-QAM base signal may be enhanced (e.g., by at least 5 dB) utilizing a randomly generated auxiliary signal codebook of a given length (e.g., 50). This may correspond to an improvement in RF-DC conversion efficiency greater than 8 dB for an input power less than −3 dB, for example as suggested in FIG. 3(a) comparing an OFDM signal to a chaotic signal that have a maximum PAPR difference of 2.8 dB. The PAPR upper-bound (e.g., as shown in FIGS. 14C and 14D) may be achievable using a well-designed auxiliary signal codebook of a given length. For example, the length may be M=$2^{24 \times N}$, which may have a signaling overhead proportional to 24×N bits.

Figure 14E:
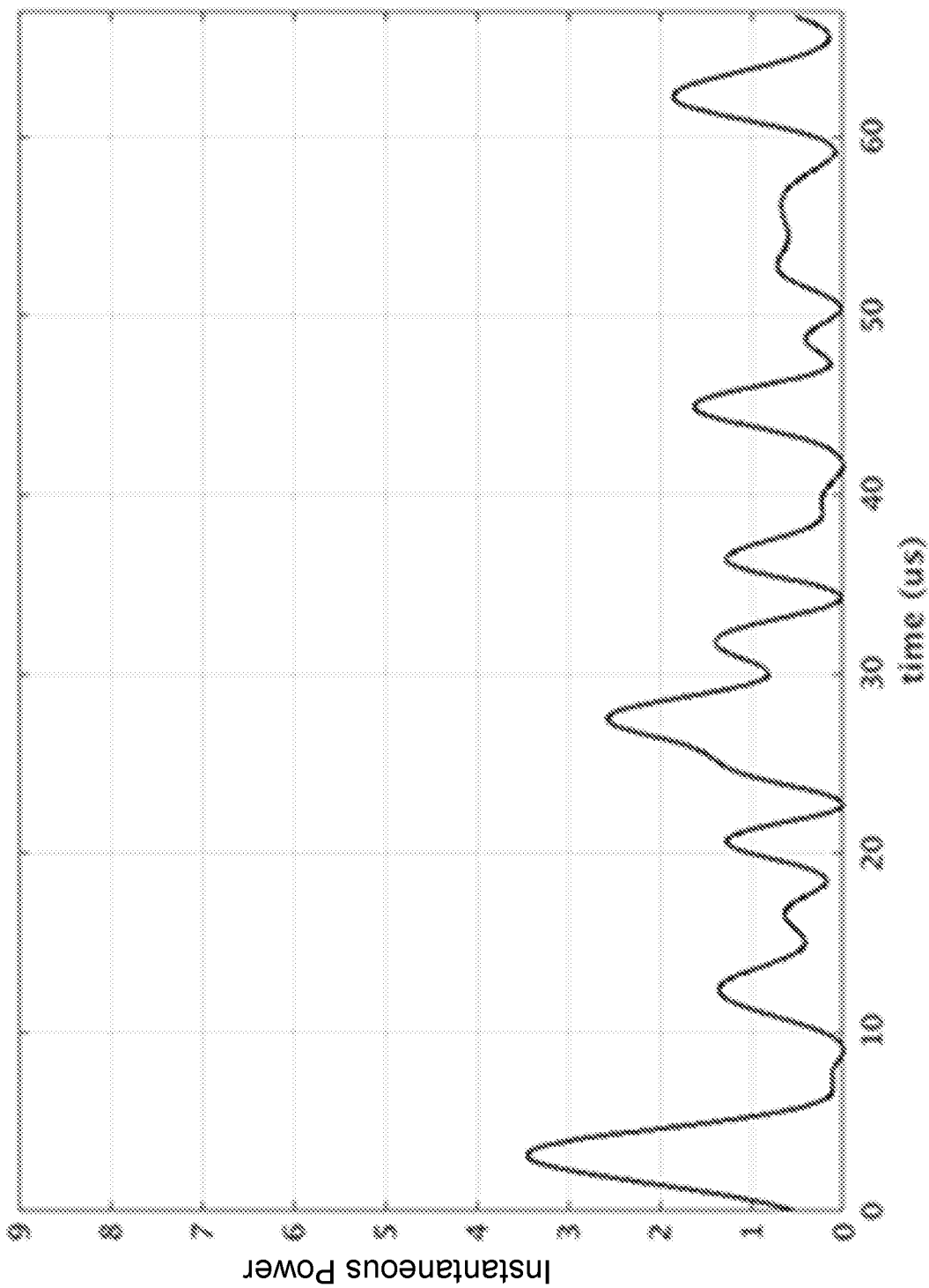
FIG. 14E shows an example realization of an EH signal (e.g., a 2 RB-portion of a 16-QAM base information signal) in the time domain before auxiliary signal enhancement.
Figure 14F:
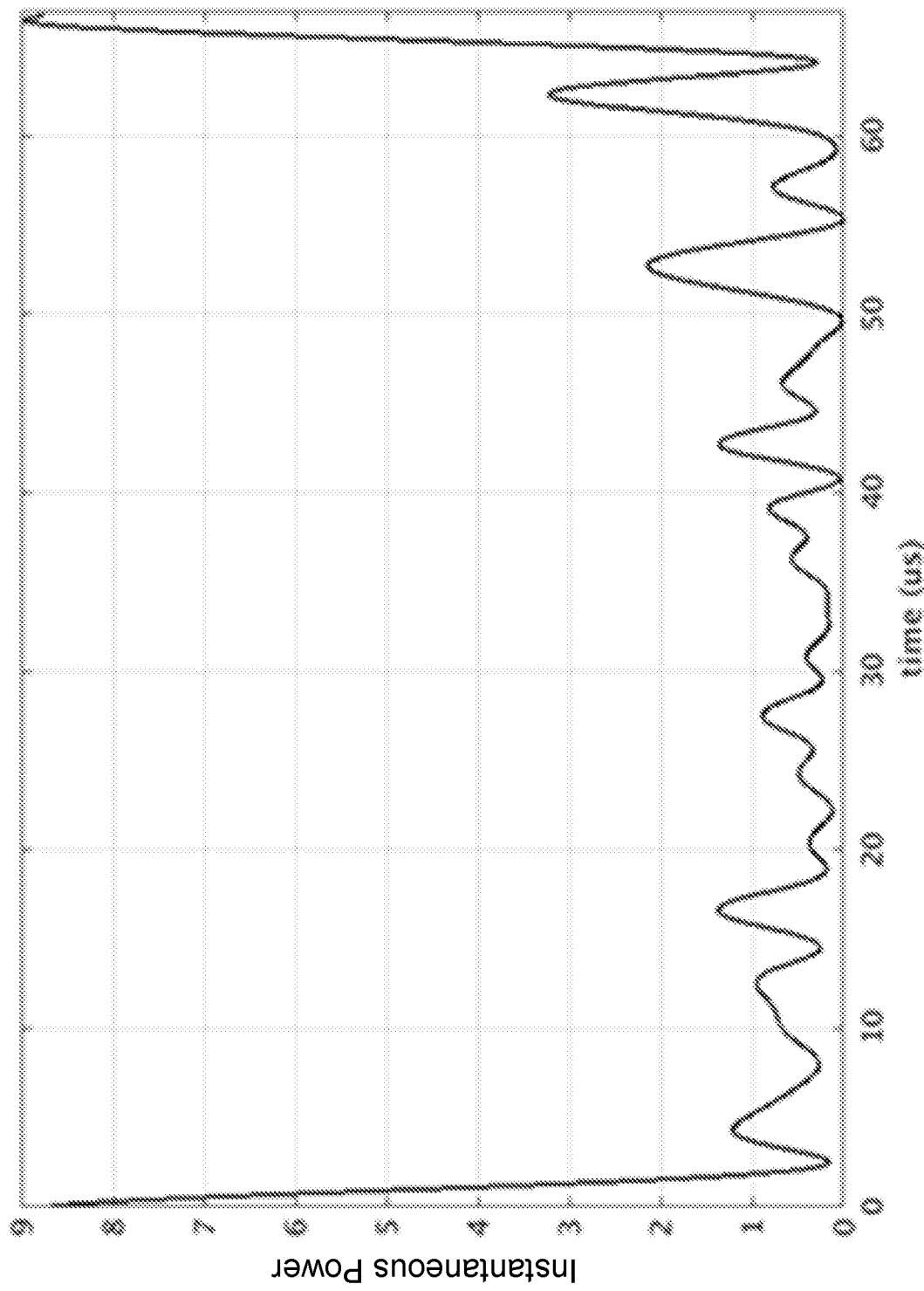
FIG. 14F shows an example realization of an EH signal (e.g., a 2 RB-portion of a 16-QAM base information signal) in the time domain after auxiliary signal enhancement.

A sample realization of the generated OFDM symbol time-domain signal before and after base information signal enhancement using the auxiliary signal may be shown in FIGS. 14E and 14F, respectively (e.g., for a 16-QAM modulated signal). As shown in FIGS. 14E and 14F, the auxiliary signal may enhance the PAPR of the combined time-domain signal where, for example, the maximum instantaneous power may increase by a factor of ~157%.

An auxiliary Tx signal may be adapted. The adaptation of an auxiliary Tx signal may be signaled. For example, the auxiliary Tx signal may be adapted in the time domain.

For a fixed sequence variance, an amplitude stretching factor may be changed to set the PAPR of a sequence to a preconfigured value using, for example, a generalized Box-Muller transform. The variance of the sum of two independently generated sequences may be equal to the sum of the individual variances.

For example, a generalized Box-Muller transform may be used. The real part of the sequence, which may be denoted as $X_I$, and the imaginary part of the sequence, which may be denoted as $X_Q$, may be derived according to the following equations:

$$X_I = \sqrt{a_1 h(\gamma)} (-\log u_1)^{\frac{\gamma}{2}} \cos(2\pi u_2)$$

$$X_Q = \sqrt{a_1 h(\gamma)} (-\log u_1)^{\frac{\gamma}{2}} \sin(2\pi u_2)$$

where $u_1$, $u_2$ may be independent samples chosen from a uniform distribution in (0,1) and γ may be an amplitude stretching factor in (0,1). h(γ) may be derived according to the following equation:

$$h(\gamma) = \frac{1}{\int_0^1 (-\log u_1)^\gamma}$$

The variance of the PAPR enhancing sequence, $X=X_I+jX_Q$, may be:

$$\text{Var}(X) = E[(X_I + jX_Q)(X_I - jX_Q)]$$
$$= a_1 \ \forall \ \gamma \in (0, 1)$$

For a constant variance of $a_1$, the amplitude stretching factor h(γ) may be modified, which may adapt the magnitude part of the Box-Muller transformation to obtain the desired PAPR.

An adaptive PAPR enhancing sequence (e.g., of a pre-specified length) may be parameterized by an initial random seed and/or an amplitude stretching factor. The amplitude stretching factor may be denoted as γ. One or more initial random seeds may be used to generate the PAPR adaptive sequence, $X=X_I+jX_Q$, where $X_I$, $X_Q$ may be defined in the above equations. For example, two initial random seeds may be used for generating random sequences $u_1$, $u_2$ respectively (e.g., as shown in the equations above) of a prespecified length. The amplitude stretching factor $\gamma$ may dictate the function $h(\gamma)$ as shown in the above equations.

The initial random seed(s) and/or $\gamma$ may be made a deterministic function of one or more parameters, for example one or more OFDM symbols (e.g., intervals), timeslot, subframe, frame, system frame number (SFN), superframe, hyper frame number, a counter, timer value, C-RNTI, G-RNTI, Physical Cell Identity (PCI), Global cell ID, UTC time, etc., which may enable the transmitter and information receiver to implicitly determine them.

Parameters $\gamma$ and the initial seed(s) for generating $u_1$, $u_2$ (e.g., as defined in the above equations) may be associated with adapting the PAPR of the sequence for use with an information receiver and/or energy harvesting receiver. The parameters may be pre-configured, known, and stored in memory in the WTRU. The transmission characteristics may be signaled and configurable in the WTRU. For example, network node(s) (e.g., MME or eNB) may use control signaling in the form of NAS, RRC, MAC CE or L1 (e.g., DCI) signaling, using the main cellular modem (e.g., when active) to configure and/or indicate transmission formats for the purpose of PAPR adaptation using a information receiver or energy harvesting receiver by a WTRU.

The auxiliary Tx signal may be adapted in the frequency domain (e.g., in a similar way as the auxiliary Tx signal may be constructed in the frequency domain as described herein).

A noise sequence may be transmitted (e.g., or activated) in one or more frequencies (e.g., only in specific frequencies). The frequencies may be changed (e.g., dynamically) at a TP. A noise shaping function may be active for one or more frequencies (e.g., only for specific frequencies) at a particular time instant (e.g., subframe etc.) at a TP. The noise components for the remaining frequencies at the time instant from the TP may be assumed to be zero. The frequencies in which the noise is active may change (e.g., dynamically) with time for a TP, and the frequency hopping pattern over which the noise is active may be preconfigured or signaled explicitly to the information receiver. For example, the frequencies in which the noise is active may change every 100 ms. The noise shaping function $g_k(f)$ at the $k^{th}$ TP may be (e.g., dynamically) changed.

A TP (e.g., each TP) may produce noise in a given frequency. The energy harvester and/or the information receiver may receive a signal from one or more TPs (e.g., all TPs). The received signal spanning the entire bandwidth may have the desired PAPR characteristics. The energy harvester and/or the information receiver may be able to determine the auxiliary Tx signal for cancelation (e.g., as it is aware of noise shaping functions used by all TPs).

One or more narrowband EH implementations may be disclosed herein. An EH device may be responsible for accurately providing/declaring its EH capability to a serving BS/eNB/gNB (e.g., to help optimize the energy harvesting operation). The EH capability information may include one or more of the following features.

The EH capability information may include the supported energy harvesting sub-band bandwidth, the number of sub-bands that may be simultaneously supported, and/or a list of sub-bands (e.g., all the sub-bands) that may be supported for devices with fixed configurations. For example, for a carrier frequency of 2 GHz and a channel bandwidth of 20 MHz, the channel 20 MHz band may be discretized into one or more (e.g., 10) sub-bands, each of which may be 2 MHz and/or may be assigned an index. The EH device may provide a list that includes a subset of the sub-band indices as a list of supported sub-bands. The supported bandwidth associated with a sub-band (e.g., each sub-band) may be different from the discretized value (e.g., 2 MHz). Using the whole channel bandwidth may be considered as a special case. For example, in a 20 MHz channel, the EH device may report the support of 2 simultaneous sub-bands, with each being 2 RBs wide (e.g., 24×15 kHz=360 kHz bandwidth) and a gap spacing of 8 RBs between the supported sub-bands. For example, for a channel that includes 100 RBs, the total number of supported sub-bands may be 10.

The EH capability information may include a mapping between EH signal formats and the device's achievable energy harvesting efficiency (e.g., a minimum PAPR to achieve a certain efficiency). For example, the EH device may declare (e.g., request) a 30% harvesting efficiency. A standardized mapping may be used to determine the minimum required PAPR for the EH signal to achieve the declared efficiency. The EH device may declare (e.g., request) the minimum required PAPR (e.g., directly).

A device's EH capability information may be signaled (e.g., provided) to the serving BS/eNB/gNB using one or more of the following. The device's EH capability may be signaled (e.g., provided) as part of an existing PUCCH/UCI format transmission over the Uu air interface, for example during a scheduling request and/or CSI reporting. For example, the device's EH capability may be signaled as an information element and/or field. For example, a WTRU may consider PUCCH format 4 to multiplex $K_{CSI}$ UCI bits corresponding to one or more CSI report(s), $K_{SRs}$ UCI bits corresponding to ($2^{K_{SRs}}-1$) scheduling resources (SRs), and dedicating (e.g., allocating), for example, $K_{EHbw}=3$ UCI bits to convey information about supported EH sub-band bandwidth in terms of equivalent RBs for a total number of UCI bits in the PUCCH of $K_{UCI}=K_{EHbw}+K_{SRs}+K_{CSI}$.

The device's EH capability may be signaled (e.g., provided) as a PUCCH/UCI format that is dedicated for energy transfer configuration and/or reporting. For example, a PUCCH format 5 may be used. The PUCHH format 5 may include $K_{EHbw}$ UCI bits for EH sub-band bandwidth reporting, $K_{nSBs}$ for the number of supported sub-band(s) in a channel, and/or one or more bits used to convey information about a list (e.g., a fixed list) of supported sub-bands.

The device's EH capability may be signaled (e.g., provided) as a backscattered signal format transmission. The EH capability may be signaled in response to a poll/control message initiated by the network (e.g., the BS) over the zero-energy (ZE) air interface.

The BS serving the EH device may utilize the served device's capability information to determine a resource-efficient allocation (e.g., optimal resource efficient allocation) of sub-bands to deliver the EH signal to the served devices. The term BS as used herein may refer to a gNB, an eNB, and/or any other type of network device. The BS may signal the selected configuration parameters to the EH devices. The BS's EH signaling information may be conveyed as disclosed herein, and may include one or more of the information elements.

The signaling information may include a list of the sub-bands considered for EH signal transmissions. For example, the list may be a list of center frequencies and/or a list of indices associated with a set of pre-configurations. A BS signaling may include a reference subcarrier/PRB number (e.g., PRB #0) and/or an index to a set of preconfigured parameters. For example, the BS signaling may include an index to a 2 PRB sub-band bandwidth and/or an 18 PRB spacing between allocated sub-bands for EH. A BS signaling may include a list of indices. For example, a first index may correspond to a sub-band starting at subcarrier #0 and having a 1 PRB equivalent bandwidth. A second index may correspond to a sub-band starting at subcarrier #48 and having a 2 PRB equivalent bandwidth. One or more other indices may be included in a BS signaling.

The signaling information may include a bandwidth (e.g., number of sub-carriers) and/or a target PAPR/efficiency associated with the sub-bands (e.g., each of the sub-bands) considered for auxiliary signal superposition. For example, a BS signaling may include a list of discretized EH efficiencies corresponding to an allocated EH sub-band (e.g., each allocated EH sub-band) and/or a value that may be applicable to one or more (e.g., all) sub-bands.

Figure 15A:
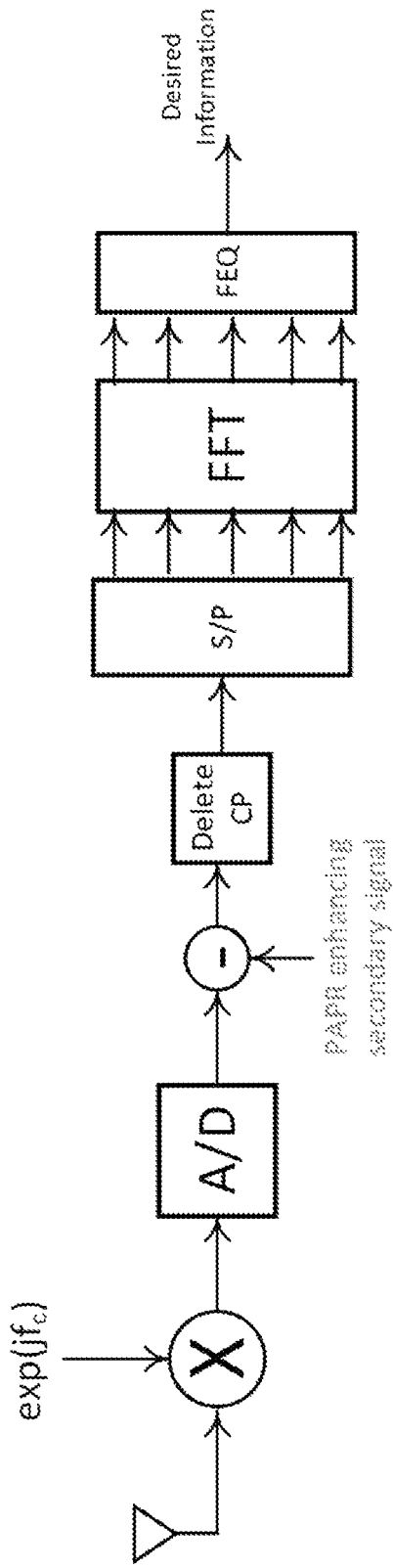
FIG. 15A shows an example cancellation of an auxiliary transmission signal in the time domain by an OFDM information device employing a direct conversion IQ RF frontend.
Figure 15B:
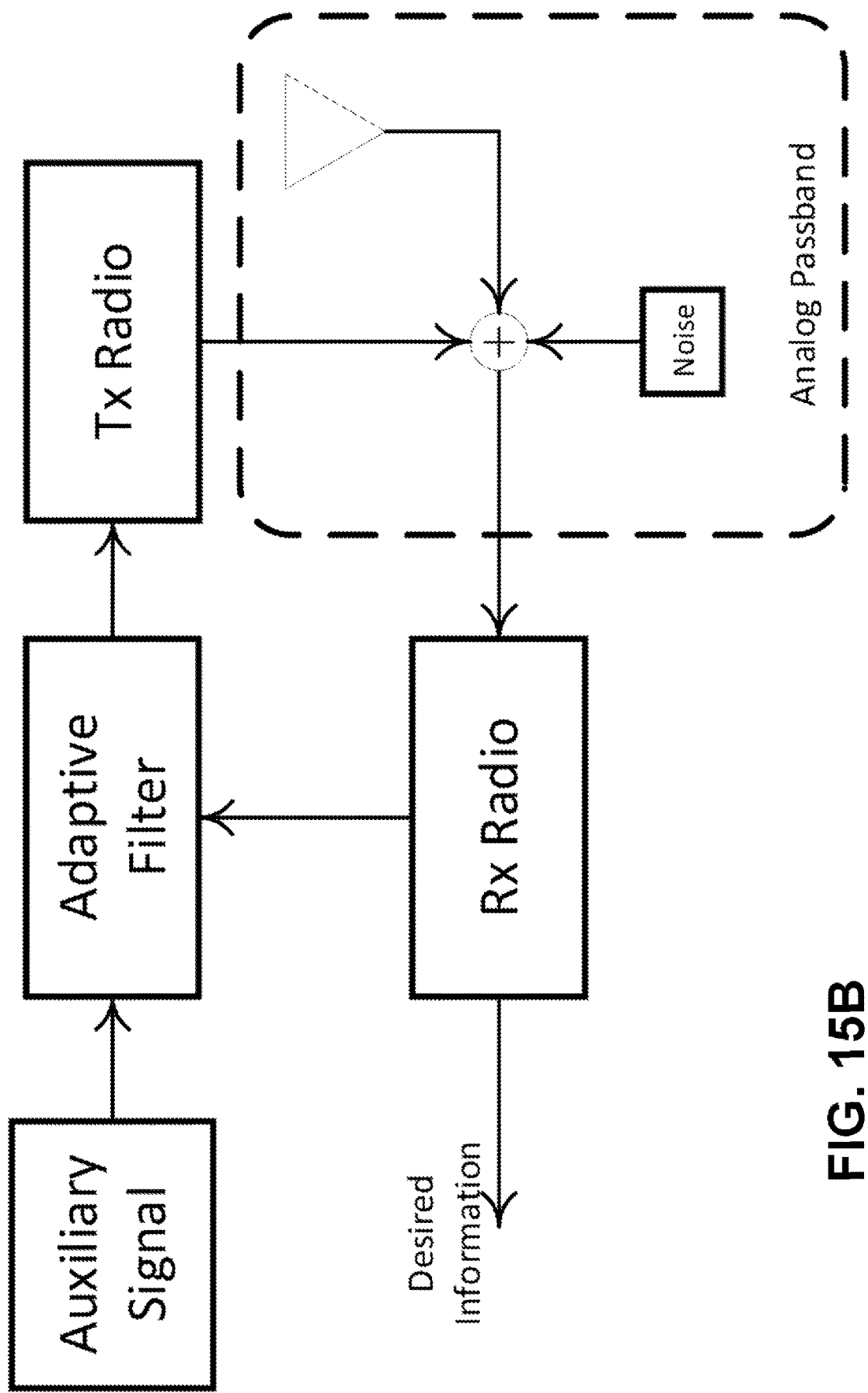
FIG. 15B shows an example architecture of auxiliary RF signal cancellation at analog passband that may utilize adaptive filtering for channel estimation.

The impact of auxiliary Tx signals on the information receiving device may be mitigated. For example, the impact of the auxiliary Tx signals may be mitigated in the time domain. FIG. 15A shows an example cancellation of an auxiliary transmission signal in the time domain by an OFDM information device, e.g. employing a direct conversion IQ RF frontend. A block diagram of an OFDM device employing a direct conversion IQ RF frontend may be shown in FIG. 15A. As illustrated in FIG. 15A, the cancellation of the auxiliary Tx signal may be performed in the time domain (e.g., after the base band conversion and analog to digital conversion). The auxiliary signal cancellation may be performed in the time domain at analog baseband (e.g., after the mixer or directly at RF). Auxiliary signal cancellation directly at RF may result in the alleviation of a low noise amplifier (LNA) performance limitation when processing high PAPR signals. FIG. 15B shows an example architecture for auxiliary signal RF cancellation in the analog passband domain, utilizing adaptive filtering for channel estimation. The example shown in FIG. 15B may be related to a self-interference cancellation architecture for full-duplex systems.

An auxiliary Tx signal may be signaled (e.g., explicitly) and/or provided (e.g., by the transmitter) as side information to the information device. The auxiliary Tx signal may be canceled to enable high SINR decoding. A known reference signal may be embedded in the auxiliary signal to help the information receiver estimate the auxiliary signal and cancel the auxiliary signal from the received signal. For example, for frequency domain auxiliary signal generation in an OFDM based system, a set of subcarriers may be dedicated to the auxiliary signal. A subset of the subcarriers may be occupied by a reference signal known to the eNB/gNB and the information receiver.

The auxiliary Tx signal may be determined (e.g., implicitly) by the information device based on preconfigured implementations or functions depending on one or more parameters, for example one or more OFDM symbols (e.g., intervals), timeslot, subframe, frame, system frame number (SFN), superframe, hyper frame number, a counter, timer value, C-RNTI, G-RNTI, Physical Cell Identity (PCI), Global cell ID, UTC time, etc.

The auxiliary signal may be blindly detected at the information receiver, for example as one in a set of known signals that are dynamically or periodically signaled to the receiver and/or statically preconfigured at the information receiver. The known signals may be transmitted to the receiver using system information and/or dedicated downlink control signals.

Parameters for determining an initial seed or initial state associated with determining the noise sequence may be pre-configured, known, and stored in memory in the WTRU. The transmission characteristics may be signaled and configurable in the WTRU. For example, network node(s) (e.g., MME or eNB) may use control signaling in the form of NAS, RRC, MAC CE or L1 (e.g., DCI) signaling, using the main cellular modem (e.g., when active) to configure and/or indicate transmission formats for the purpose of canceling the auxiliary sequence at the information receiver by a WTRU.

Figure 16:
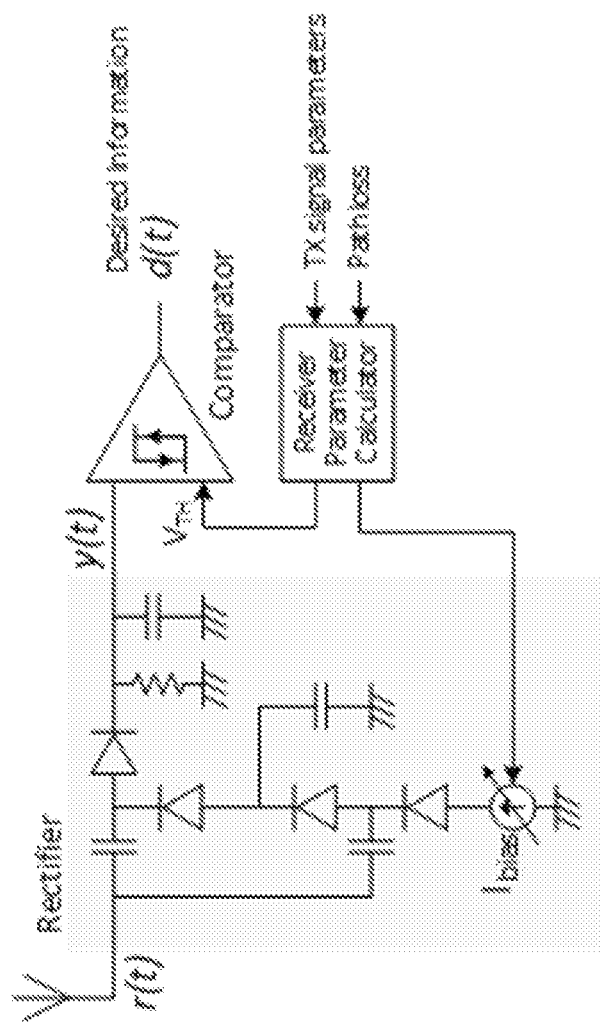
FIG. 16 shows an example of mitigating the impact of a PAPR enhancing auxiliary transmission signal by selecting the parameters of a direct-envelope detection (ED) information receiving device employing a data slicer.

An example associated with mitigating the performance impact of an auxiliary Tx signal on a direct envelope detection (ED) information device is shown in FIG. 16. FIG. 16 shows an example associated with mitigating the impact of a PAPR enhancing auxiliary transmission signal by selecting the parameters of a direct-ED information receiving device employing a data slicer. In FIG. 16, the information bearing base Tx signal may be, for example, an OOK signal or an M-OOK signal. A rectifier employed by the direct-ED device may consist of a diode (e.g., a single diode) or a diode array with a biasing ($I_{bias}$) mechanism. A comparator with threshold voltage $V_{TH}$ may be used (e.g., after the rectifier) as a data slicer. The output of the comparator d(t) may represent the received information. The optimal settings for the direct-ED device parameter set $\{I_{bias}, V_{TH}\}$ may be determined using a device parameter calculator.

The direct-ED device parameter calculator may use the pathloss and the parameters of the transmitted signal to set $\{I_{bias}, V_{TH}\}$. The parameters of the transmitted signal may include, for example, the type of sequence used by the transmitter to construct the PAPR enhancing auxiliary Tx signal. The threshold voltage $V_{TH}$ of the data slicer may be set according to the following formula:

$$V_{TH} = k\sqrt{\zeta\eta}$$

where $\zeta$ may be the pathloss and $\eta$ may be the conversion efficiency of the rectifier (e.g., the diode array shown in FIG. 16). A look-up table may be used to estimate the rectifier conversion efficiency $\eta$ from the transmitter signal parameters. The conversion efficiency of the rectifier may be determined from the transmitted signal PAPR. The transmitted signal PAPR may be determined from the base Tx signal and the auxiliary Tx signal properties. The parameter k (e.g., where k>1) may be determined from a lookup table. The parameter k may be a scale factor.

Figure 17:
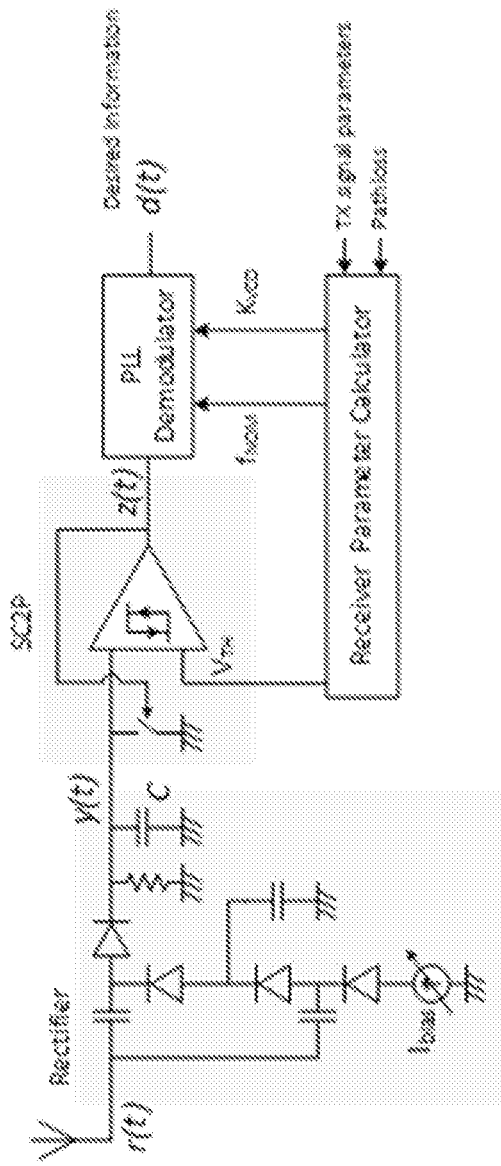
FIG. 17 shows an example of mitigating the impact of a PAPR enhancing auxiliary transmission signal by selecting the parameters of a direct-ED information receiving device employing a phase locked loop (PLL) demodulator.

A direct-ED device employing a data slicer (e.g., as illustrated in FIG. 16) may have low complexity. The ability of the direct-ED device to reject in-band and out-of-band interferers may be limited. An example of a direct-ED device employing a stored-charge-to-pulse (SC2P) converter and a PLL demodulator is illustrated in FIG. 17. FIG. 17 shows an example associated with mitigating the impact of a PAPR enhancing auxiliary transmission signal, e.g., by selecting the parameters of a direct-ED information receiving device employing a PLL demodulator. The primary signal may be, for example, an OOK signal or an M-OOK signal. The direct-ED device architecture illustrated in FIG. 17 may be more immune (e.g., compared to the architecture shown in FIG. 16) to in-band and out-of-band interferers.

Parameters of the direct-ED device illustrated FIG. 17 may include the threshold voltage $V_{TH}$ of the SC2P and/or the nominal frequency $f_{NOM}$ and gain $K_{VCO}$ of the voltage controlled oscillator (VCO) employed by the PLL demodulator. The parameters of the PLL demodulator may be set using the following formulas:

$$K_{VCO} = (f_{MAX} - f_{MIN})/\Delta V_{VCO}$$

$$f_{NOM} = a_1 f_{MAX} + a_2 f_{MIN}$$

$$0 < a_1, a_2 < 1 \text{ and } a_1 + a_2 = 1$$

where $f_{MAX}$ and $f_{MIN}$ may be the minimum and maximum frequency of the output signal z(t) of the SC2P. $\Delta V_{VCO}$ may be the range of the control voltage used to set VCO frequency.

The parameters $f_{MAX}$ and $f_{MIN}$ may be defined as $f_{MAX}=1/\tau ON$ and $f_{MIN}=1/\tau OFF$, where $\tau ON$ and $\tau OFF$ may be the periods of the SC2P output z(t) associated with the ON and OFF periods of the received OOK or M-OOK base Tx signal. The equation below may be used to relate $f_{MAX}$ and $f_{MIN}$ of the SC2P output z(t) to the transmitted signal parameters and pathloss:

$$\frac{k\sqrt{\zeta\eta}}{C}\int_0^\tau i(t)dt = V_{TH}$$

For a configured threshold voltage $V_{TH}$ of the SC2P, the period $\tau$ of the SC2P output signal z(t) may be calculated by the device parameter calculator using the above equation, where $\zeta$ may be the pathloss and $\eta$ may be the conversion efficiency of the rectifier. A look-up table may be used to estimate the rectifier conversion efficiency $\eta$ from the transmitter signal parameters. The conversion efficiency of the rectifier may be determined from the transmitted signal PAPR. The transmitted signal PAPR may be determined from the base Tx signal and the auxiliary Tx signal properties. The parameter k (e.g., where k>1) may be determined from a lookup table. The parameter k may be a scale factor.

The impact of the auxiliary Tx signals may be mitigated in the frequency domain. The information device may be pre-configured with a static or dynamically changing noise shaping function g(f). g(f) may be signaled explicitly. g(f) may be a function of one or more parameters, for example one or more OFDM symbols (e.g., intervals), timeslot, subframe, frame, system frame number (SFN), superframe, hyper frame number, a counter, timer value, C-RNTI, G-RNTI, Physical Cell Identity (PCI), Global cell ID, UTC time, etc., or may be static (e.g., as the spectral components belonging to PSS, SSS, or CRS locations may be of a prespecified power etc.).

Figure 18:
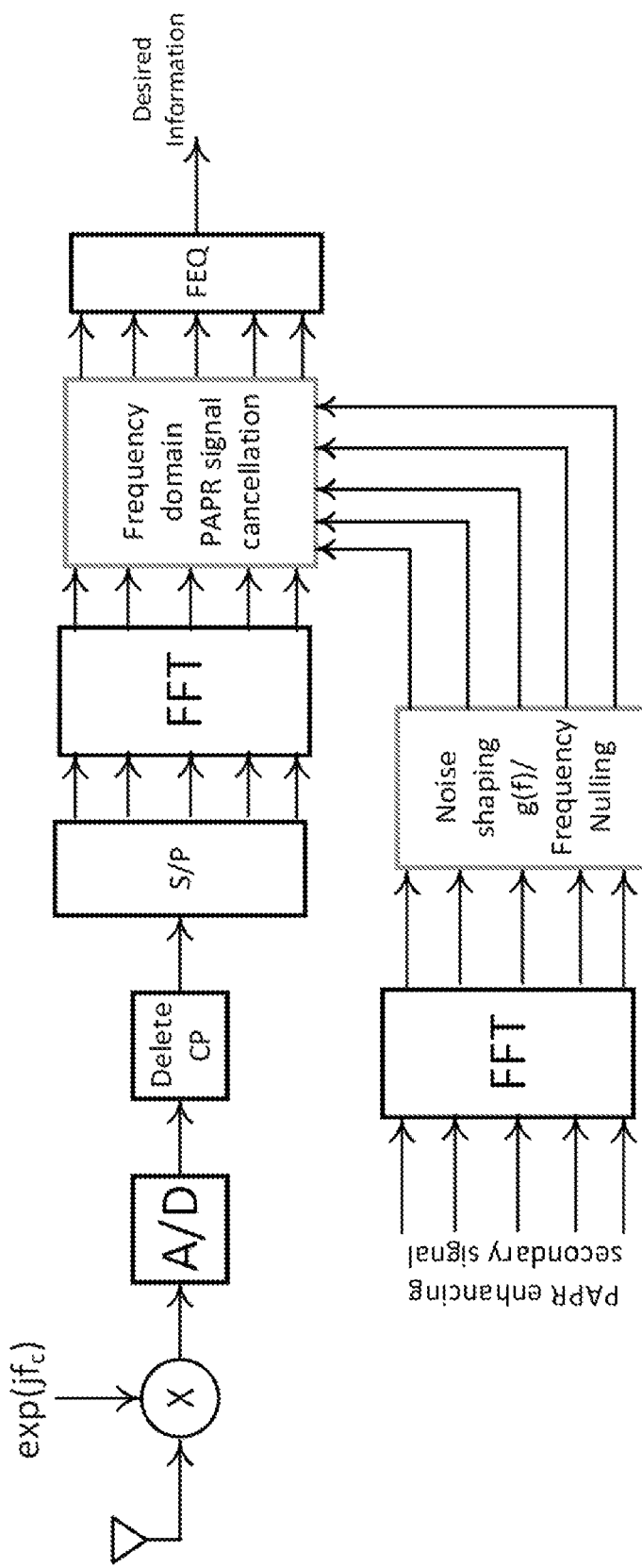
FIG. 18 shows an example cancellation of a noise shaped PAPR enhancing auxiliary transmission signal at an information device.

Canceling a noise shaped PAPR enhancing signal at the information device may include one or more of the following. With the initial state/seed determined with a function (e.g., as described herein) the information device may generate the PAPR enhancing signal, X(t), locally. Using the predetermined or signaled noise shaping function g(f), the information device may generate the noise shaped PAPR enhancing sequence, $X_N(f)=X(f)g(f)$, where X(f) may denote the FFT of X(t). $X_N(f)$ may be cancelled from the FFT of the demodulated signal (e.g. as shown in FIG. 18). FIG. 18 shows an example cancellation of a noise shaped PAPR enhancing auxiliary transmission signal at an information device.

The noise shaping function for determining the appropriate pseudo noise or chaotic sequence transmission in the frequency domain for use with an information receiver for interference cancelation may be pre-configured, known, and stored in memory in the WTRU. The transmission characteristics may be signaled and configurable in the WTRU. For example, network node(s) (e.g., MME or eNB) may use control signaling in the form of NAS, RRC, MAC CE or L1 (e.g., DCI) signaling, e.g., using the main cellular modem (e.g., when active) to configure and/or indicate transmission formats for the purpose of canceling the auxiliary sequence at the information receiver by a WTRU. The effective aggregation of one or more of (e.g., all) the individual functions considered at a cooperating TP (e.g., each of the cooperating TPs) may be signaled to the information receiver. The effective aggregation may be signaled directly to the information receiver. The effective aggregation may be signaled instead of reporting the individual function for each cooperating TP and letting the information receiver form the combined/aggregated function.

Figure 19:
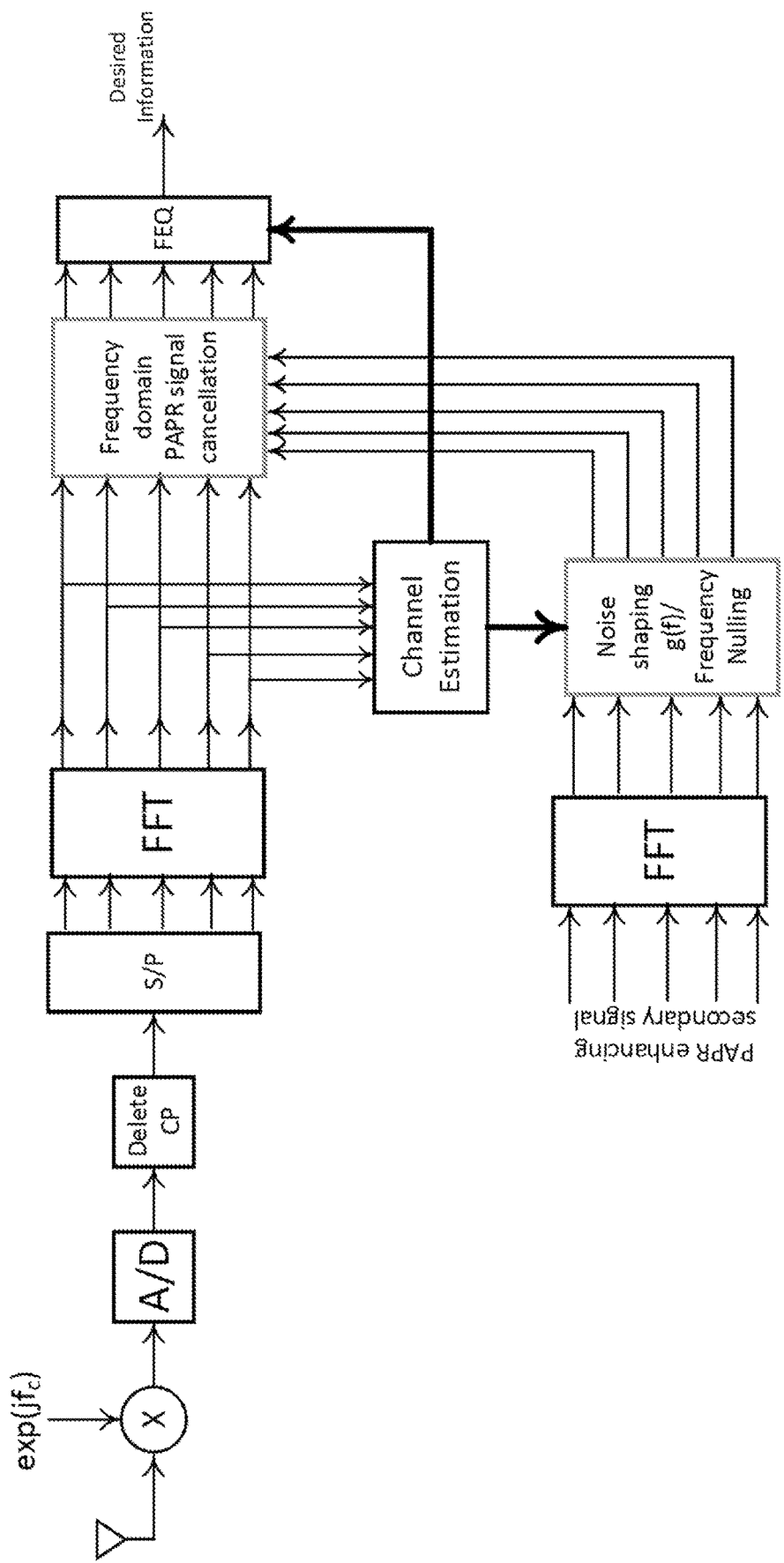
FIG. 19 shows an example cancellation of a noise shaped PAPR enhancing auxiliary Tx signal incorporating channel estimation at an information device.

When the impact of the channel is taken into consideration, the overall impact may be estimated at the serving eNB/gNB. The overall impact may be embedded into the assisting information conveying information about the aggregate noise shaping function to the information receiver. For example, the impact on the received signal (e.g., the impact of the channel) may change one or more characteristics of the received pseudo noise/chaotic sequence at the information receiver. The change in the characteristics may be taken into account by the information receiver, for example while trying to cancel interference caused by transmission of the sequences. The channel from the cooperating TPs may be estimated individually or collectively at the information receiver and/or applied to the individual or aggregate noise function(s) correspondingly (e.g., as shown in FIG. 19).

One or more narrowband EH implementations may be disclosed herein. A modification in part of or the whole information signal bandwidth may be a source of interference for the information receiver. A modification may include the introduction (e.g., addition) of specific auxiliary signals at fixed sub-band(s) and/or sub-bands that adaptively change over the duration of information signal transmission. For example, the auxiliary signal may be combined with a base information signal. The auxiliary signal may have a higher PAPR than the base information signal.

The information receiver may obtain assisting information from the network (e.g., the serving BS/eNB/gNB) on how to effectively eliminate (e.g., cancel) the source of interference. For example, the information receiver may use the information to (e.g., efficiently) decode the received information. The assisting information may be the EH sub-band allocation pattern (e.g., any change of the allocated sub-bands for EH due to a change in the capabilities of served EH devices). For example, the assisting information may include an indication of a sub-band associated with the auxiliary signal and/or a time duration associated with a sub-band. The assisting information may be delivered using one or more of the following.

The assisting information may be delivered as a sequence of sub-band indices that is signaled (e.g., explicitly signaled). The assisting information may be delivered as an index to a row in a table, where the table may be preconfigured in the information receiver and/or or signaled as part of a separate control or system information message (e.g., via DCI). For example, the table may be part of an auxiliary signal codebook. The table may contain a sequence of sub-band indices. The assisting information may be delivered as a mapping function that is selected from a set of preconfigured functions. The mapping function may use the index/indices of the current OFDM symbol/slot/subframe/frame and/or one or more arguments that are signaled to the EH device as an argument. The assisting information may be delivered as a seed to a random sequence generator and a corresponding sequence type. The assisting information may include the time duration and/or number of OFDM symbols/slots/subframes/frames associated with a sub-band allocation (e.g., each sub-band allocation). The information receiver may use the assisting information (e.g., the indication) and/or the auxiliary signal codebook to identify the auxiliary signal. The information receiver may decode the base information signal by canceling interference from the identified auxiliary signal.

The information receiver may receive (e.g., as a form of assisting information) one or more parameters associated with the auxiliary signal (e.g., a sequence type associated with the auxiliary signal) that may help generate the auxiliary signal (e.g., or signals) introduced to the information signal spectrum to be cancelled from the overall received signal. The parameters may be signaled to the information receiver via DCI. The parameters of the auxiliary signal(s) and its adaptation may be signaled to the information receiver as disclosed herein and/or according to one or more of the following. The parameters of the auxiliary signal(s) and its adaptation may be signaled as an index in a table of auxiliary signals (e.g., an auxiliary signal codebook). The auxiliary signal codebook may be preconfigured at the information receiver and/or signaled as part of system information (e.g., via DCI). The parameters of the auxiliary signal(s) and its adaptation may be signaled as an argument and/or a mapping function that may be chosen from a set of functions. The set of functions may be preconfigured at the information receiver and/or signaled as part of system information.

The information receiver may receive information (e.g., only) on the sub-band allocation pattern and may determine the auxiliary signal(s) that were transmitted using blind decoding/detection. The complexity may increase as the number of auxiliary signals to be detected increases. For example, for the information receiver to match the performance of a codebook that uses 5 bits of signaling using blind decoding, the information receiver may perform the blind detection of 32 different auxiliary signals (e.g., if the information receiver already knows the sub-band within its allocated resources that may be considered for auxiliary signal enhancement). If the information receiver is unaware of the location of the EH sub-band, the complexity may increase. For example, if EH devices can support 10 different EH sub-bands within an information receiver allocated bandwidth, the information receiver may to go through $32^{10}$ combinations to blindly detect the auxiliary signal and cancel it from the received signal.

The delivery of energy and information may be co-optimized. For example, a transmitter and a device may encode and decode the auxiliary Tx signal, respectively. As described herein, the auxiliary Tx signal (e.g., PAPR enhancing auxiliary sequence) may be a pseudo noise, chaotic noise, or other noise sequence that is generated dynamically or using deterministic implementations (e.g., as described herein).

Based on the SFN or subframe in which the auxiliary Tx signal (e.g., PAPR enhancing sequence) is transmitted, the transmitter may generate a noise sequence of length N, using an initial seed determined by a function involving on one or more parameters, for example one or more OFDM symbols (e.g., intervals), timeslot, subframe, frame, system frame number (SFN), superframe, hyper frame number, a counter, timer value, C-RNTI, G-RNTI, Physical Cell Identity (PCI), Global cell ID, UTC time, etc., where N may denote a time period of the noise sequence or the FFT length.

Based on the preconfigured subframe or SFN during which the auxiliary Tx signal (e.g., PAPR enhancing signal) is to be received, the information device may use a deterministic function (e.g., the same deterministic function used by the transmitter) to determine the seed. The information device may generate a noise sequence (e.g., the same noise sequence) of length N. The information device may cancel out the PAPR enhancing signal (e.g., during the demodulation stage), for example as depicted in FIGS. 15A and/or 18.

An impact of a channel may be mitigated. If the link or channel quality is unknown, it may not be possible to determine the minimum appropriate PAPR level at which the transmission is performed to maximize energy harvesting efficiency. A PAPR ramp up implementation may be used, in which the amplitude stretching factor γ (e.g., as described herein) may be increased. The amplitude stretching factor may be increased in a predetermined manner. The PAPR ramp up implementation may include one or more of the following.

The subframe and/or SFN at which the PAPR ramping begins and ends may be preconfigured or may be explicitly signaled to the information device. The initial amplitude stretching factor may be set to γ=x, where x may be an initial value that may be implementation dependent. Using the initial seed for random sequences $u_1$, $u_2$ (e.g., as described herein) that may be determined as a function involving on one or more parameters and the chosen stretching factor γ, the sequence may be known locally at the information device (e.g., for cancellation). For example, the parameters may include one or more OFDM symbols (e.g., intervals), timeslot, subframe, frame, system frame number (SFN), superframe, hyper frame number, a counter, timer value, C-RNTI, G-RNTI, Physical Cell Identity (PCI), Global cell ID, UTC time, etc. (e.g., as described herein), The amplitude stretching factor may be modified a pre-specified number of times by updating γ=γ+y, where a stretching increment factory may be preconfigured. The stretching increment factor y may be an initial value that may be implementation dependent. The sequence using the updated amplitude stretching factor may be known locally at the information device (e.g., for cancellation).

Although features and elements described above are described in particular combinations, each feature or element may be used alone without the other features and elements of the preferred embodiments, or in various combinations with or without other features and elements.

Although the implementations described herein consider 3GPP specific protocols, it is understood that the implementations described herein are not restricted to this scenario and may be applicable to other wireless systems.

Though the implementations described herein and provided examples cover drones and aerial vehicles, the implementations and examples covered here may equally apply to all wireless terminals.

What is claimed is:

1. A wireless transmit/receive unit (WTRU) comprising:
a processor configured to:
receive an auxiliary signal codebook;
receive an indication from a network via a downlink control information (DCI), wherein the indication indicates an index that identifies a sub-band associated with an auxiliary signal and a time duration associated with the sub-band;
identify the auxiliary signal based on the auxiliary signal codebook and the indication; and
perform a cancelation associated with the identified auxiliary signal and decode a base information signal.

2. The WTRU of claim 1, wherein the auxiliary signal codebook is received from the network.

3. The WTRU of claim 1, wherein the auxiliary signal codebook is preconfigured in the WTRU.

4. The WTRU of claim 1, wherein a peak-to-average power ratio (PAPR) of the auxiliary signal is higher than a PAPR of the base information signal.

5. The WTRU of claim 1, wherein the indication further indicates a parameter associated with the auxiliary signal.

6. The WTRU of claim 5, wherein the parameter associated with the auxiliary signal comprises a sequence type of the auxiliary signal.

7. The WTRU of claim 1, wherein the auxiliary signal comprises one or more sub-carriers or resource blocks (RBs) that span a subset of resources allocated for the WTRU.

8. The WTRU of claim 1, wherein the cancelation associated with the identified auxiliary signal is a cancelation of the identified auxiliary signal.

9. The WTRU of claim 1, wherein the cancelation associated with the identified auxiliary signal is a cancelation of the identified auxiliary signal in an interfering region.

10. A method implemented in a wireless transmit/receive unit (WTRU), the method comprising:
receiving an auxiliary signal codebook;
receiving an indication from a network via a downlink control information (DCI), wherein the indication indicates an index that identifies a sub-band associated with an auxiliary signal and a time duration associated with the sub-band;
identifying the auxiliary signal based on the auxiliary signal codebook and the indication; and
performing a cancelation associated with the identified auxiliary signal and decoding a base information signal.

11. The method of claim 10, wherein the auxiliary signal codebook is received from the network.

12. The method of claim 10, wherein the auxiliary signal codebook is preconfigured in the WTRU.

13. The method of claim 10, wherein the indication further indicates a parameter associated with the auxiliary signal, and wherein the parameter associated with the auxiliary signal comprises a sequence type of the auxiliary signal.

14. The method of claim 10, wherein the cancelation associated with the identified auxiliary signal is a cancelation of the identified auxiliary signal.

15. The method of claim 10, wherein the cancelation associated with the identified auxiliary signal is a cancelation of the identified auxiliary signal in an interfering region.

* * * * *